United States Patent
Lim et al.

(10) Patent No.: US 11,302,290 B2
(45) Date of Patent: Apr. 12, 2022

(54) VEHICLE DEVICE, DISPLAY METHOD FOR DISPLAYING INFORMATION OBTAINED FROM AN EXTERNAL ELECTRONIC DEVICE IN VEHICLE DEVICE AND ELECTRONIC DEVICE, AND INFORMATION TRANSMISSION METHOD IN ELECTRONIC DEVICE

(71) Applicant: Samsung Electronics Co., Ltd., Gyeonggi-do (KR)

(72) Inventors: Yong-Jun Lim, Seoul (KR); Tae-Young Ha, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/476,675

(22) PCT Filed: Jan. 11, 2018

(86) PCT No.: PCT/KR2018/000534
§ 371 (c)(1),
(2) Date: Jul. 9, 2019

(87) PCT Pub. No.: WO2018/131908
PCT Pub. Date: Jul. 19, 2018

(65) Prior Publication Data
US 2019/0378475 A1 Dec. 12, 2019

(30) Foreign Application Priority Data

Jan. 12, 2017 (KR) .................. 10-2017-0004943

(51) Int. Cl.
*G09G 5/14* (2006.01)
*G06F 3/04817* (2022.01)
(Continued)

(52) U.S. Cl.
CPC .......... *G09G 5/14* (2013.01); *G06F 3/04817* (2013.01); *B60K 35/00* (2013.01);
(Continued)

(58) Field of Classification Search
None
See application file for complete search history.

(56) References Cited

U.S. PATENT DOCUMENTS 9,098,180 B1    8/2015  Craig et al.
9,420,406 B2    8/2016  Chen et al.
(Continued)

FOREIGN PATENT DOCUMENTS

JP    2012-83981 A    4/2012
JP    2013-221769 A   10/2013
(Continued)

*Primary Examiner* — Steven Z Elbinger
(74) *Attorney, Agent, or Firm* — Cha & Reiter, LLC.

(57) ABSTRACT

Described are various embodiments related to a vehicle device and an electronic device, wherein the vehicle device according to one embodiment can include: a display; a memory; at least one or more sensors; communication circuitry configured to communicate with an external electronic device; and a processor configured to display first display information according to execution of a first application on a first area on the display, perform control to transfer vehicle-related context information to the electronic device based on information obtained by the at least one or more sensors and, if information related to a second application corresponding to the vehicle-related context information is received from the electronic device, display second display information associated with the second application on a second area on the display using the received information.

8 Claims, 26 Drawing Sheets

(51) Int. Cl.
*B60K 35/00* (2006.01)
*G07C 5/00* (2006.01)
*G07C 5/08* (2006.01)

(52) U.S. Cl.
CPC .... *G06F 2203/04803* (2013.01); *G07C 5/008* (2013.01); *G07C 5/0825* (2013.01); *G09G 2370/16* (2013.01); *G09G 2380/10* (2013.01)

(56) References Cited

U.S. PATENT DOCUMENTS

| | | | | |
|---|---|---|---|---|
| 2011/0257973 | A1* | 10/2011 | Chutorash | B60R 16/0373 704/235 |
| 2012/0096404 | A1 | 4/2012 | Matsumoto et al. | |
| 2013/0274998 | A1 | 10/2013 | Kato et al. | |
| 2014/0200739 | A1* | 7/2014 | Kirsch | H04W 4/023 701/1 |
| 2014/0350833 | A1* | 11/2014 | Park | G01C 21/3688 701/123 |
| 2015/0025917 | A1* | 1/2015 | Stempora | G06K 9/0061 705/4 |
| 2015/0094949 | A1* | 4/2015 | Kato | G01C 21/3688 701/410 |
| 2015/0145750 | A1 | 5/2015 | Shin | |
| 2015/0251538 | A1* | 9/2015 | Tamura | B60K 35/00 340/461 |
| 2016/0349075 | A1* | 12/2016 | Son | G01C 21/3697 |
| 2017/0120932 | A1* | 5/2017 | Szczerba | B60W 50/10 |
| 2017/0334500 | A1* | 11/2017 | Jarek | G06F 3/16 |
| 2018/0137595 | A1* | 5/2018 | Kim | G06Q 50/14 |

FOREIGN PATENT DOCUMENTS

| | | |
|---|---|---|
| JP | 2015-68814 A | 4/2015 |
| KR | 10-1055155 B1 | 8/2011 |
| KR | 10-1369264 B1 | 2/2014 |
| KR | 10-1459481 B1 | 11/2014 |
| KR | 10-2015-0033355 A | 4/2015 |
| KR | 20150033355 A * | 4/2015 |
| KR | 10-2015-0060370 A | 6/2015 |

* cited by examiner

VEHICLE DEVICE, DISPLAY METHOD FOR DISPLAYING INFORMATION OBTAINED FROM AN EXTERNAL ELECTRONIC DEVICE IN VEHICLE DEVICE AND ELECTRONIC DEVICE, AND INFORMATION TRANSMISSION METHOD IN ELECTRONIC DEVICE

CROSS-REFERENCE TO RELATED APPLICATION(S)

This application is a National Phase Entry of PCT International Application No. PCT/KR2018/000534, which was filed on Jan. 11, 2018, and claims priority to Korean Patent Application No. 10-2017-0004943, which was filed on Jan. 12, 2017, the contents of which are incorporated herein by reference.

BACKGROUND

1. Field

Various embodiments of the present invention relate to vehicle devices and electronic devices.

2. Description of the Related Art

With car technology developing, vehicles come equipped with an in-vehicle infotainment (IVI) system or other vehicle devices to allow the user to receive various pieces of information and services. The growth of smartphones or other electronic devices enables the user to receive various types of information and services on their portable device while on the move.

Recently underway are efforts to provide merged services of vehicle-related services and mobile communication-related services by interoperation between IVI system and portable device. Examples may encompass allowing application information from a portable device to be used on an IVI system or allowing for use on a portable device of an application to provide vehicle-related services.

SUMMARY

Technical Problem

Conventionally, applications for in-vehicle infotainment systems and applications for portable devices have been developed to be used independently but not to interwork organically, forcing the user to individually and independently use applications on the in-vehicle infotainment system and applications on portable devices. This is quite inconvenient.

There has been an ongoing effort to allow information or services from an in-vehicle infotainment system application to be provided via a portable device or other electronic device while allowing information or services from an electronic device application to be provided via an in-vehicle infotainment system. However, in-vehicle infotainment systems cannot display information or services, which are displayed on a portable device, as they are, due to limitations on display of information or services which may be attributed to their nature of being required to provide information or service while the user is driving. This results in inconvenience.

Accordingly, according to various embodiments, there may be provided a vehicle device and electronic device which enable organic interoperation between an application of an in-vehicle infotainment system and an application of a portable device, a method of displaying on the vehicle device, and a method of transmitting information on the electronic device.

According to various embodiments, there may also be provided a vehicle device and electronic device which allow all of information or service from an in-vehicle infotainment system application and information or service from a portable device application to be received via an in-vehicle infotainment system, a method of displaying on the vehicle device, and a method of transmitting information on the electronic device.

According to various embodiments, there may also be provided a vehicle device and electronic device which allow display information related to information or service from an electronic device application, which may not be received due to limitations on display in vehicle, to be received even in vehicle by enabling the in-vehicle infotainment system to convert the display information related to the information or service from the electronic device application according to display conditions of the in-vehicle infotainment system, a method of displaying on the vehicle device, and a method of transmitting information on the electronic device.

According to various embodiments, a vehicle device comprises a display, a memory, at least one or more sensors, a communication unit configured to communicate with an external electronic device, and a processor configured to display first display information according to execution of a first application on a first area on the display, perform control to transfer vehicle-related context information to the electronic device based on information obtained by the at least one or more sensors and, if information related to a second application corresponding to the vehicle-related context information is received from the electronic device, display second display information associated with the second application on a second area on the display using the received information.

According to various embodiments, a method of display on a vehicle device comprises displaying first display information associated with a first application stored in a memory on a first area on a display, performing control to transfer vehicle-related context information to an electronic device based on information obtained by at least one or more sensors, and if information related to a second application corresponding to the vehicle-related context information is received from the electronic device, performing control to display second display information associated with the second application on a second area on the display using the received information.

According to various embodiments, an electronic device comprises a memory, a communication unit configured to communicate with a vehicle device, and a processor electrically connected with the memory and the communication unit, wherein the processor is configured to, when vehicle-related context information is received from the vehicle device, perform a function corresponding to the vehicle-related context information using a first application associated with the vehicle-related context information among at least one or more applications, transmit first information according to a result of performing the function to the vehicle device, when a first request based on the first information is received from the vehicle device, perform a second function corresponding to the first request using the first application, and transmit second information according to a result of performing the second function to the vehicle device.

According to various embodiments, a method of transmitting information on an electronic device comprises receiving vehicle-related context information from a vehicle device, performing a first function corresponding to the vehicle-related context information using an application associated with the vehicle-related context information among at least one or more applications and transmitting first information according to a result of performing the first function to the vehicle device, and when a first request based on the first information is received from the vehicle device, performing a second function corresponding to the first request using the application associated with the vehicle-related context information and transmitting second information according to a result of performing the second function to the vehicle device.

According to various embodiments, there is provided a storing medium storing a program executed on a vehicle device, the program displaying first display information according to execution of a first application stored in a memory on a first area on a display, performing control to transfer vehicle-related context information to the electronic device based on information obtained by the at least one or more sensors, and if information related to a second application corresponding to the vehicle-related context information is received from the electronic device, performing control to display second display information on a second area on the display using the received information.

According to various embodiments, there is provided a non-transitory storage medium storing a program executed on an electronic device, the program receiving vehicle-related context information from a vehicle device, performing a first function corresponding to the vehicle-related context information using an application associated with the vehicle-related context information among at least one or more applications and transmitting first information according to a result of performing the first function to the vehicle device, and when a first request based on the first information is received from the vehicle device, performing a second function corresponding to the first request using the application associated with the vehicle-related context information and transmitting second information according to a result of performing the second function to the vehicle device.

According to various embodiments of the present invention, it is possible to enable an application of an in-vehicle infotainment system and an application of a portable device to interoperate in an organic manner.

According to various embodiments, it is also possible to allow all of information or service from an in-vehicle infotainment system application and information or service from a portable device application to be received via an in-vehicle infotainment system.

According to various embodiments, it is also possible to allow display information related to information or service from an electronic device application, which may not be received due to limitations on display in vehicle, to be received even in vehicle by enabling the in-vehicle infotainment system to convert the display information related to the information or service from the electronic device application according to display conditions of the in-vehicle infotainment system.

DETAILED DESCRIPTION

Figure 1:
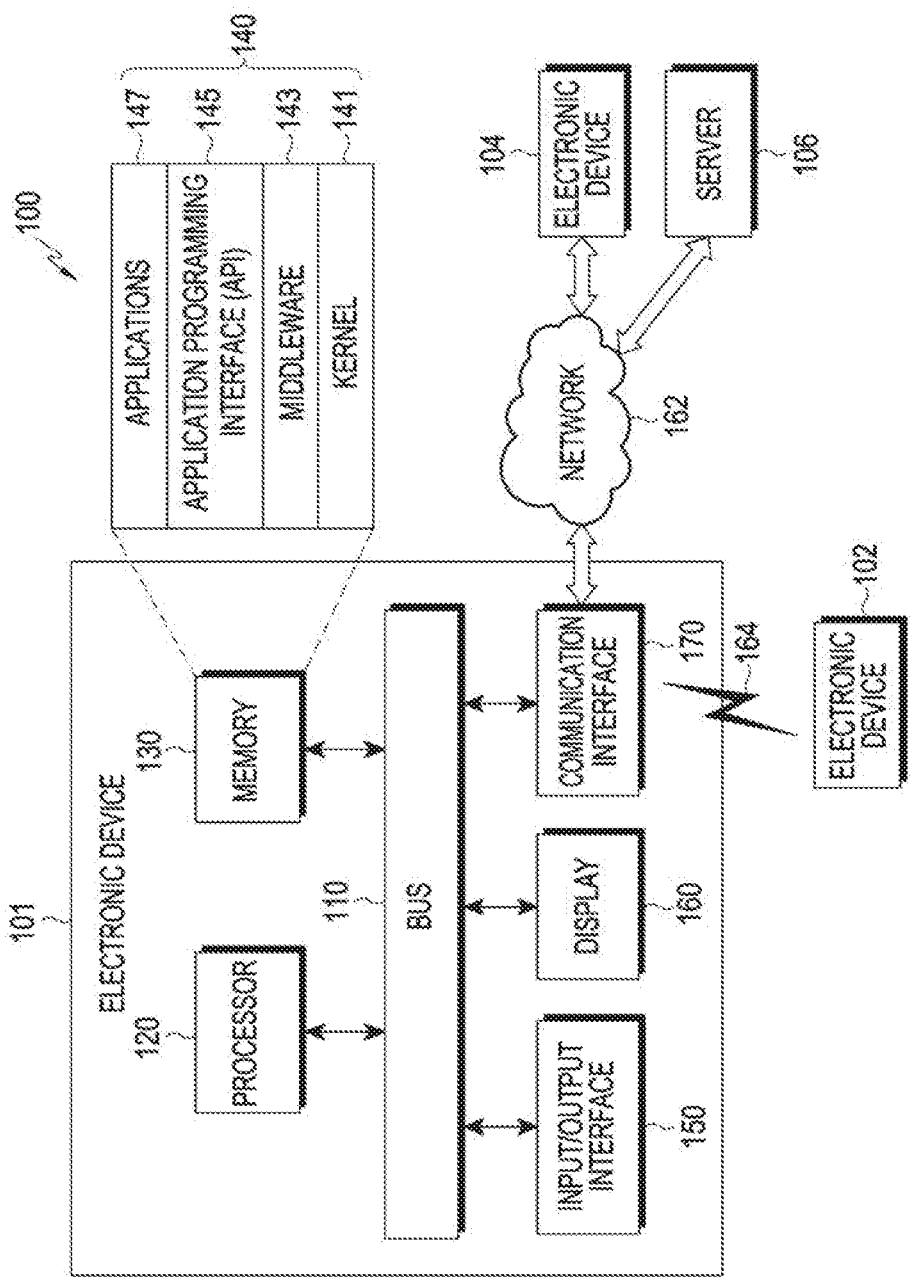
FIG. 1 is a block diagram illustrating a network environment including an electronic device according to various embodiments.

Hereinafter, embodiments of the present disclosure are described with reference to the accompanying drawings.

However, it should be appreciated that the present disclosure is not limited to the embodiments and the terminology used herein, and all changes and/or equivalents or replacements thereto also belong to the scope of the present disclosure. The same or similar reference denotations may be used to refer to the same or similar elements throughout the specification and the drawings. It is to be understood that the singular forms "a," "an," and "the" include plural references unless the context clearly dictates otherwise. As used herein, the terms "A or B" or "at least one of A and/or B" may include all possible combinations of A and B. As used herein, the terms "first" and "second" may modify various components regardless of importance and/or order and are used to distinguish a component from another without limiting the components. It will be understood that when an element (e.g., a first element) is referred to as being (operatively or communicatively) "coupled with/to," or "connected with/to" another element (e.g., a second element), it can be coupled or connected with/to the other element directly or via a third element.

As used herein, the terms "configured to" may be interchangeably used with other terms, such as "suitable for," "capable of," "modified to," "made to," "adapted to," "able to," or "designed to" in hardware or software in the context. Rather, the term "configured to" may mean that a device can perform an operation together with another device or parts. For example, the term "processor configured (or set) to perform A, B, and C" may mean a generic-purpose processor (e.g., a CPU or application processor) that may perform the operations by executing one or more software programs stored in a memory device or a dedicated processor (e.g., an embedded processor) for performing the operations.

For example, examples of the electronic device according to embodiments of the present disclosure may include at least one of a smartphone, a tablet personal computer (PC), a mobile phone, a video phone, an e-book reader, a desktop PC, a laptop computer, a netbook computer, a workstation, a server, a personal digital assistant (PDA), a portable multimedia player (PMP), an MP3 player, a medical device, a camera, or a wearable device. The wearable device may include at least one of an accessory-type device (e.g., a watch, a ring, a bracelet, an anklet, a necklace, glasses, contact lenses, or a head-mounted device (HMD)), a fabric- or clothes-integrated device (e.g., electronic clothes), a body attaching-type device (e.g., a skin pad or tattoo), or a body implantable device. In some embodiments, examples of the smart home appliance may include at least one of a television, a digital video disk (DVD) player, an audio player, a refrigerator, an air conditioner, a cleaner, an oven, a microwave oven, a washer, a drier, an air cleaner, a set-top box, a home automation control panel, a security control panel, a TV box (e.g., Samsung HomeSync™, Apple TV™, or Google TV™), a gaming console (Xbox™, PlayStation™), an electronic dictionary, an electronic key, a camcorder, or an electronic picture frame.

According to an embodiment of the present disclosure, the electronic device may include at least one of various medical devices (e.g., diverse portable medical measuring devices (a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global navigation satellite system (GNSS) receiver, an event data recorder (EDR), a flight data recorder (FDR), an sailing electronic device (e.g., a sailing navigation device or a gyro compass), avionics, security devices, industrial or home robots, drones, automatic teller machines (ATMs), point of sales (POS) devices, or Internet of things (IoT) devices (e.g., a bulb, various sensors, a sprinkler, a fire alarm, a thermostat, a street light, a toaster, fitness equipment, a hot water tank, a heater, or a boiler). According to various embodiments of the disclosure, examples of the electronic device may at least one of part of a piece of furniture, building/structure or vehicle, an electronic board, an electronic signature receiving device, a projector, or various measurement devices (e.g., devices for measuring water, electricity, gas, or electromagnetic waves). According to embodiments of the present invention, the electronic device may be flexible or may be a combination of the above-enumerated electronic devices. According to an embodiment of the disclosure, the electronic devices are not limited to those described above. As used herein, the term "user" may denote a human or another device (e.g., an artificial intelligent electronic device) using the electronic device.

Referring to FIG. 1, according to an embodiment of the present disclosure, an electronic device 100 is included in a network environment 101. The electronic device 101 may include a bus 110, a processor 120, a memory 130, an input/output interface 150, a display 160, and a communication interface 170. In some embodiments, the electronic device 101 may exclude at least one of the components or may add another component. The bus 110 may include a circuit for connecting the components 110 to 170 with one another and transferring communications (e.g., control messages or data) between the components. The processor 120 may include one or more of a central processing unit (CPU), an application processor (AP), or a communication processor (CP). The processor 120 may perform control on at least one of the other components of the electronic device 101, and/or perform an operation or data processing relating to communication.

The memory 130 may include a volatile and/or non-volatile memory. For example, the memory 130 may store commands or data related to at least one other component of the electronic device 101. According to an embodiment of the present disclosure, the memory 130 may store software and/or a program 140. The program 140 may include, e.g., a kernel 141, middleware 143, an application programming interface (API) 145, and/or an application program (or "application") 147. At least a portion of the kernel 141, middleware 143, or API 145 may be denoted an operating system (OS). For example, the kernel 141 may control or manage system resources (e.g., the bus 110, processor 120, or a memory 130) used to perform operations or functions implemented in other programs (e.g., the middleware 143, API 145, or application program 147). The kernel 141 may provide an interface that allows the middleware 143, the API 145, or the application 147 to access the individual components of the electronic device 101 to control or manage the system resources.

The middleware 143 may function as a relay to allow the API 145 or the application 147 to communicate data with the kernel 141, for example. Further, the middleware 143 may process one or more task requests received from the application program 147 in order of priority. For example, the middleware 143 may assign a priority of using system resources (e.g., bus 110, processor 120, or memory 130) of the electronic device 101 to at least one of the application programs 147 and process one or more task requests. The API 145 is an interface allowing the application 147 to control functions provided from the kernel 141 or the middleware 143. For example, the API 133 may include at least one interface or function (e.g., a command) for filing control, window control, image processing or text control. For example, the input/output interface 150 may transfer commands or data input from the user or other external device to other component(s) of the electronic device 101 or may output commands or data received from other component(s) of the electronic device 101 to the user or other external devices.

The display 160 may include, e.g., a liquid crystal display (LCD), a light emitting diode (LED) display, an organic light emitting diode (OLED) display, or a microelectromechanical systems (MEMS) display, or an electronic paper display. The display 160 may display, e.g., various contents (e.g., text, images, videos, icons, or symbols) to the user. The display 160 may include a touchscreen and may receive, e.g., a touch, gesture, proximity or hovering input using an electronic pen or a body portion of the user. For example, the communication interface 170 may set up communication between the electronic device 101 and an external device (e.g., a first electronic device 102, a second electronic device 104, or a server 106). For example, the communication interface 170 may be connected with a network 162 through wireless communication or wired communication and may communicate with an external device (e.g., the second external electronic device 104 or server 106).

The wireless communication may include cellular communication which uses at least one of, e.g., long term evolution (LTE), long term evolution-advanced (LTE-A), code division multiple access (CDMA), wideband code division multiple access (WCDMA), universal mobile telecommunication system (UMTS), wireless broadband (WiBro), or global system for mobile communication (GSM). According to an embodiment of the present invention, the wireless communication may include at least one of, e.g., wireless fidelity (Wi-Fi), Bluetooth, Bluetooth low power (BLE), Zigbee, near field communication (NFC), magnetic secure transmission (MST), radio frequency, or body area network (BAN). According to an embodiment of the present invention, the wireless communication may include global navigation satellite system (GNSS). The GNSS may be, e.g., global positioning system (GPS), global navigation satellite system (Glonass), Beidou navigation satellite system (hereinafter, "Beidou") or Galileo, or the European global satellite-based navigation system. Hereinafter, the terms "GPS" and the "GNSS" may be interchangeably used herein. The wired connection may include at least one of, e.g., universal serial bus (USB), high definition multimedia interface (HDMI), recommended standard (RS)-232, power line communication (PLC), or plain old telephone service (POTS). The network 162 may include at least one of telecommunication networks, e.g., a computer network (e.g., local area network (LAN) or wide area network (WAN)), Internet, or a telephone network.

The first and second external electronic devices 102 and 104 each may be a device of the same or a different type from the electronic device 101. According to an embodiment of the present disclosure, all or some of operations executed on the electronic device 101 may be executed on another or multiple other electronic devices (e.g., the electronic devices 102 and 104 or server 106). According to an embodiment of the present disclosure, when the electronic device 101 should perform some function or service automatically or at a request, the electronic device 101, instead of executing the function or service on its own or additionally, may request another device (e.g., electronic devices 102 and 104 or server 106) to perform at least some functions associated therewith. The other electronic device (e.g., electronic devices 102 and 104 or server 106) may execute the requested functions or additional functions and transfer a result of the execution to the electronic device 101. The electronic device 101 may provide a requested function or service by processing the received result as it is or additionally. To that end, a cloud computing, distributed computing, or client-server computing technology may be used, for example.

Figure 2:
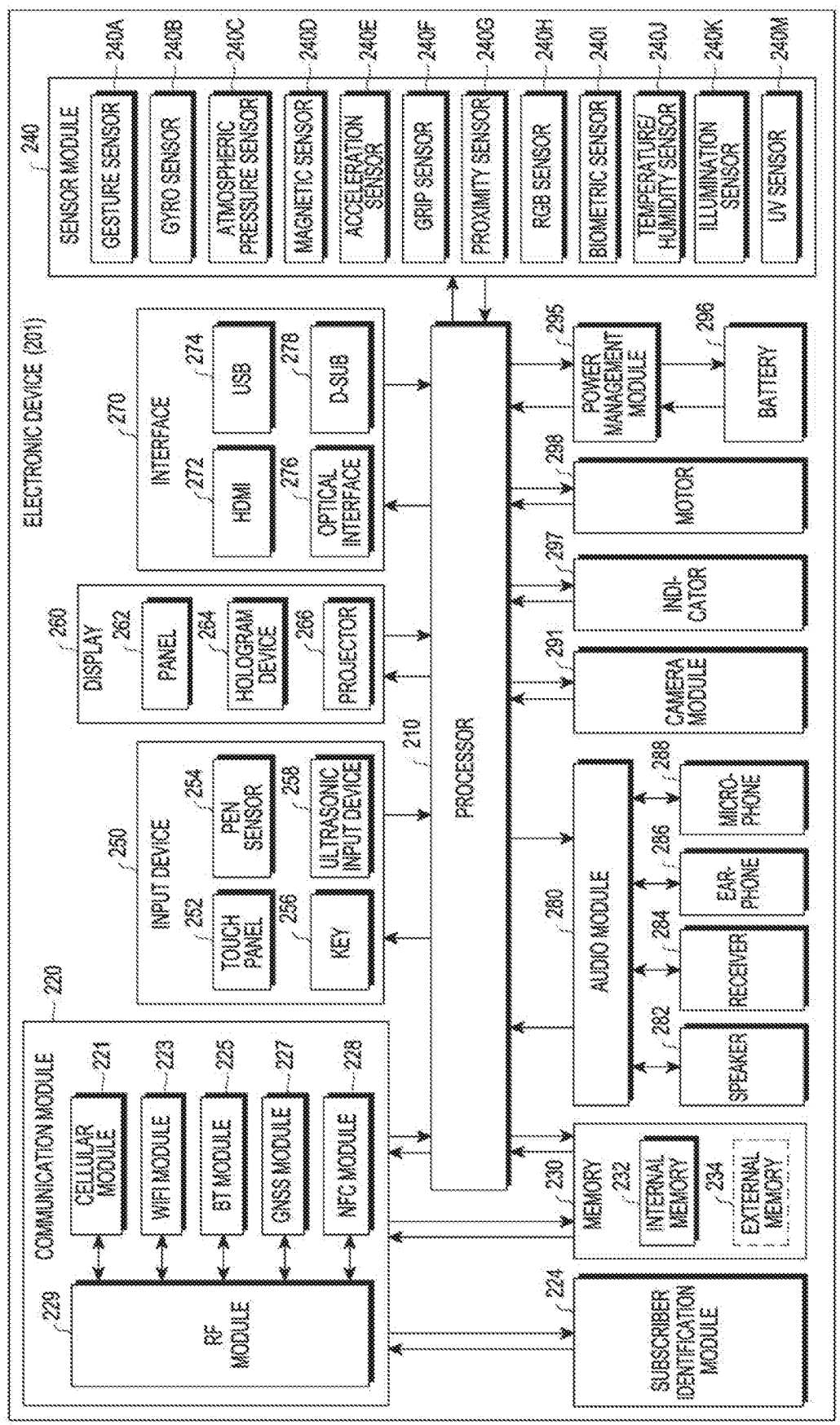
FIG. 2 is a block diagram illustrating an electronic device according to various embodiments.

FIG. 2 is a block diagram illustrating an electronic device according to various embodiments.

The electronic device 201 may include the whole or part of the configuration of, e.g., the electronic device 101 shown in FIG. 1. The electronic device 201 may include one or more processors (e.g., application processors (APs)) 210, a communication module 220, a subscriber identification module (SIM) 224, a memory 230, a sensor module 240, an input device 250, a display 260, an interface 270, an audio module 280, a camera module 291, a power management module 295, a battery 296, an indicator 297, and a motor 298. The processor 210 may control multiple hardware and software components connected to the processor 210 by running, e.g., an operating system or application programs, and the processor 210 may process and compute various data. The processor 210 may be implemented in, e.g., a system on chip (SoC). According to an embodiment of the present disclosure, the processor 210 may further include a graphic processing unit (GPU) and/or an image signal processor. The processor 210 may include at least some (e.g., the cellular module 221) of the components shown in FIG. 2. The processor 210 may load a command or data received from at least one of other components (e.g., a non-volatile memory) on a volatile memory, process the command or data, and store resultant data in the non-volatile memory.

The communication module 220 may have the same or similar configuration to the communication interface 170. The communication module 220 may include, e.g., a cellular module 221, a wireless fidelity (Wi-Fi) module 223, a Bluetooth (BT) module 225, a GNSS module 227, a NFC module 228, and a RF module 229. The cellular module 221 may provide voice call, video call, text, or Internet services through, e.g., a communication network. The cellular module 221 may perform identification or authentication on the electronic device 201 in the communication network using a subscriber identification module 224 (e.g., the SIM card). According to an embodiment of the present disclosure, the cellular module 221 may perform at least some of the functions providable by the processor 210. According to an embodiment of the present disclosure, the cellular module 221 may include a communication processor (CP). According to an embodiment of the present invention, at least some (e.g., two or more) of the cellular module 221, the Wi-Fi module 223, the Bluetooth module 225, the GNSS module 227, or the NFC module 228 may be included in a single integrated circuit (IC) or an IC package. The RF module 229 may communicate data, e.g., communication signals (e.g., RF signals). The RF module 229 may include, e.g., a transceiver, a power amp module (PAM), a frequency filter, a low noise amplifier (LNA), or an antenna. According to an embodiment of the present disclosure, at least one of the cellular module 221, the Wi-Fi module 223, the Bluetooth module 225, the GNSS module 227, or the NFC module 228 may communicate RF signals through a separate RF module. The subscription identification module 224 may include, e.g., a card including a subscriber identification module, or an embedded SIM, and may contain unique identification information (e.g., an integrated circuit card identifier (IC- CID)) or subscriber information (e.g., an international mobile subscriber identity (IMSI)).

The memory 230 (e.g., the memory 130) may include, e.g., an internal memory 232 or an external memory 234. For example, the internal memory 232 may include at least one of a volatile memory (e.g., a dynamic RAM (DRAM), a static RAM (SRAM), a synchronous dynamic RAM (SDRAM), etc.) or a non-volatile memory (e.g., a one-time programmable ROM (OTPROM), a programmable ROM (PROM), an erasable and programmable ROM (EPROM), an electrically erasable and programmable ROM (EEPROM), a mask ROM, a flash ROM, a flash memory (e.g., a NAND flash, or a NOR flash), a hard drive, or solid state drive (SSD). The external memory 234 may include a flash drive, e.g., a compact flash (CF) memory, a secure digital (SD) memory, a micro-SD memory, a min-SD memory, an extreme digital (xD) memory, a multi-media card (MMC), or a memory stick. The external memory 234 may be functionally or physically connected with the electronic device 201 via various interfaces.

For example, the sensor module 240 may measure a physical quantity or detect an operational state of the electronic device 201, and the sensor module 240 may convert the measured or detected information into an electrical signal. The sensor module 240 may include at least one of, e.g., a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (e.g., a red-green-blue (RGB) sensor, a bio sensor 240I, a temperature/humidity sensor 240J, an illumination sensor 240K, or an Ultra Violet (UV) sensor 240M. Additionally or alternatively, the sensing module 240 may include, e.g., an e-nose sensor, an electromyography (EMG) sensor, an electroencephalogram (EEG) sensor, an electrocardiogram (ECG) sensor, an infrared (IR) sensor, an iris sensor, or a finger print sensor. The sensor module 240 may further include a control circuit for controlling at least one or more of the sensors included in the sensing module. According to an embodiment of the present disclosure, the electronic device 201 may further include a processor configured to control the sensor module 240 as part of the processor 210 or separately from the processor 210 and the electronic device 2701 may control the sensor module 240 while the processor 210 is in a sleep mode.

The input unit 250 may include, e.g., a touch panel 252, a (digital) pen sensor 254, a key 256, or an ultrasonic input device 258. The touch panel 252 may use at least one of capacitive, resistive, infrared, or ultrasonic methods. The touch panel 252 may further include a control circuit. The touch panel 252 may further include a tactile layer and may provide a user with a tactile reaction. The (digital) pen sensor 254 may include, e.g., a part of a touch panel or a separate sheet for recognition. The key 256 may include e.g., a physical button, optical key or keypad. The ultrasonic input device 258 may sense an ultrasonic wave generated from an input tool through a microphone (e.g., the microphone 288) to identify data corresponding to the sensed ultrasonic wave.

The display 260 (e.g., the display 160) may include a panel 262, a hologram device 264, a projector 266, and/or a control circuit for controlling the same. The panel 262 may be implemented to be flexible, transparent, or wearable. The panel 262, together with the touch panel 252, may be configured in one or more modules. According to an embodiment of the present invention, the panel 262 may include a pressure sensor (or pose sensor) that may measure the strength of a pressure by the user's touch. The pressure sensor may be implemented in a single body with the touch panel 252 or may be implemented in one or more sensors separate from the touch panel 252. The hologram device 264 may make three dimensional (3D) images (holograms) in the air by using light interference. The projector 266 may display an image by projecting light onto a screen. The screen may be, for example, located inside or outside of the electronic device 201. The interface 270 may include e.g., a high definition multimedia interface (HDMI) 272, a USB 274, an optical interface 276, or a D-subminiature (D-sub) 278. The interface 270 may be included in e.g., the communication interface 170 shown in FIG. 1. Additionally or alternatively, the interface 270 may include a mobile high-definition link (MHL) interface, a secure digital (SD) card/multimedia card (MMC) interface, or infrared data association (IrDA) standard interface.

The audio module 280 may convert, e.g., a sound signal into an electrical signal and vice versa. At least a part of the audio module 280 may be included in, e.g., the input/output interface 145 as shown in FIG. 1. The audio module 280 may process sound information input or output through e.g., a speaker 282, a receiver 284, an earphone 286, or a microphone 288. For example, the camera module 291 may be a device for capturing still images and videos, and may include, according to an embodiment of the present disclosure, one or more image sensors (e.g., front and back sensors), a lens, an image signal processor (ISP), or a flash such as an LED or xenon lamp. The power manager module 295 may manage power of the electronic device 201, for example. According to an embodiment of the present invention, the power manager module 295 may include a power management Integrated circuit (PMIC), a charger IC, or a battery or fuel gauge. The PMIC may have a wired and/or wireless recharging scheme. The wireless charging scheme may include, e.g., a magnetic resonance scheme, a magnetic induction scheme, or an electromagnetic wave based scheme, and an additional circuit, such as a coil loop, a resonance circuit, a rectifier, or the like may be added for wireless charging. The battery gauge may measure an amount of remaining power of the battery 296, a voltage, a current, or a temperature while the battery 296 is being charged. The battery 296 may include, e.g., a rechargeable battery or a solar battery.

The indicator 297 may indicate a particular state of the electronic device 201 or a part (e.g., the processor 210) of the electronic device, including e.g., a booting state, a message state, or recharging state. The motor 298 may convert an electric signal to a mechanical vibration and may generate a vibrational or haptic effect. The electronic device 201 may include a mobile TV supporting device (e.g., a GPU) that may process media data as per, e.g., digital multimedia broadcasting (DMB), digital video broadcasting (DVB), or mediaFlo™ standards. Each of the aforementioned components of the electronic device may include one or more parts, and a name of the part may vary with a type of the electronic device. According to various embodiments, the electronic device (e.g., the electronic device 201) may exclude some elements or include more elements, or some of the elements may be combined into a single entity that may perform the same function as by the elements before combined.

Figure 3:
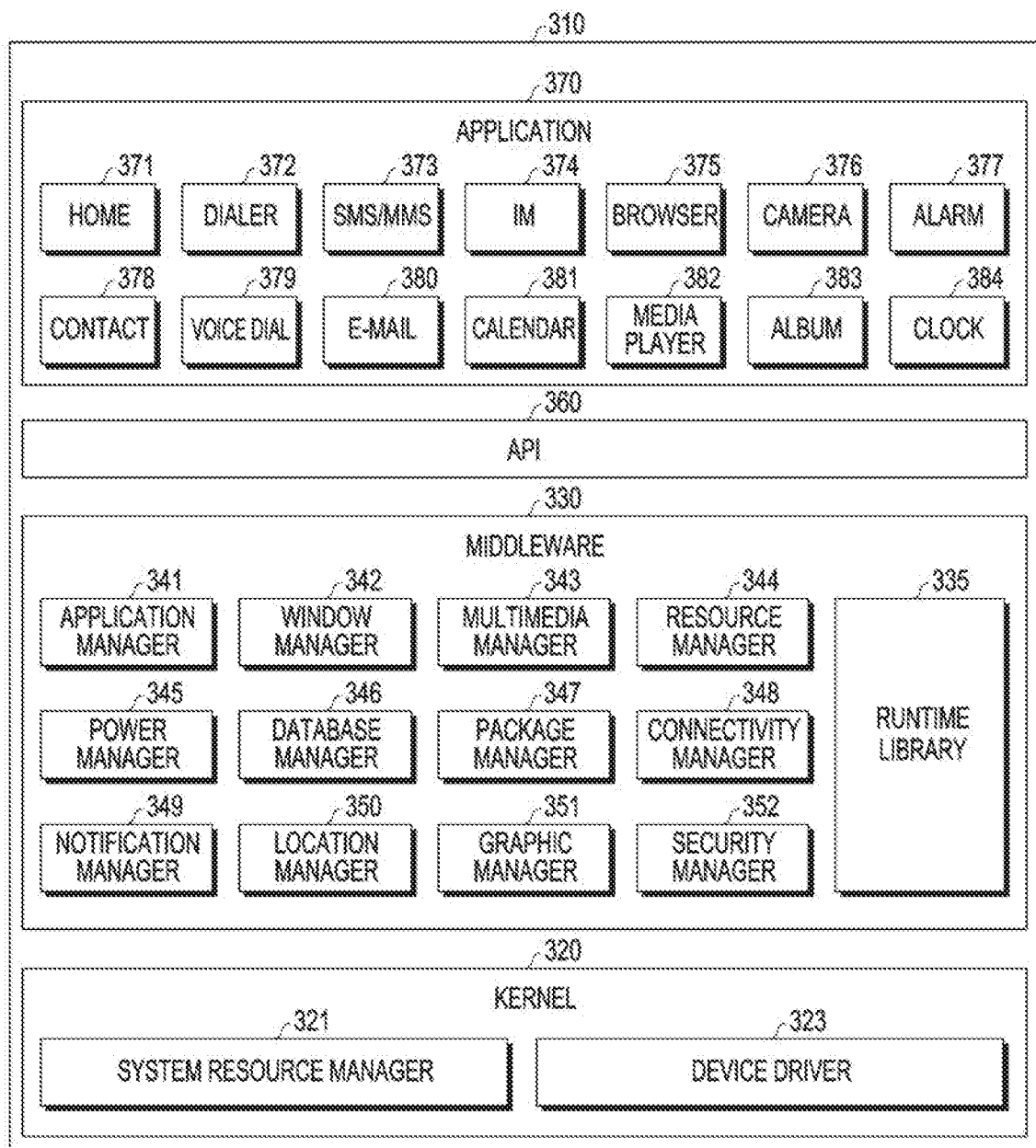
FIG. 3 is a block diagram illustrating a program module according to various embodiments.

FIG. 3 is a block diagram illustrating a program module according to various embodiments.

According to an embodiment of the present disclosure, the program module 310 (e.g., the program 140) may include an operating system (OS) controlling resources related to the electronic device (e.g., the electronic device 101) and/or various applications (e.g., the application processor 217) driven on the operating system. The operating system may include, e.g., Android™, iOS™, Windows™, Symbian™, Tizen™, or Bada™. Referring to FIG. 3, the program module 310 may include a kernel 320 (e.g., the kernel 141), middleware 330 (e.g., the middleware 143), an API 360 (e.g., the API 145), and/or an application 370 (e.g., the application program 147). At least a part of the program module 310 may be preloaded on the electronic device or may be downloaded from an external electronic device (e.g., the electronic devices 102 and 104 or server 106).

The kernel 320 may include, e.g., a system resource manager 321 or a device driver 323. The system resource manager 321 may perform control, allocation, or recovery of system resources. According to an embodiment of the present disclosure, the system resource manager 321 may include a process managing unit, a memory managing unit, or a file system managing unit. The device driver 323 may include, e.g., a display driver, a camera driver, a Bluetooth driver, a shared memory driver, a USB driver, a keypad driver, a Wi-Fi driver, an audio driver, or an inter-process communication (IPC) driver. The middleware 330 may provide various functions to the application 370 through the API 360 so that the application 370 may use limited system resources in the electronic device or provide functions jointly required by applications 370. According to an embodiment of the present invention, the middleware 330 may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, or a security manager 352.

The runtime library 335 may include a library module used by a compiler in order to add a new function through a programming language while, e.g., the application 370 is being executed. The runtime library 335 may perform input/output management, memory management, or arithmetic function processing. The application manager 341, for example, may manage the life cycle of the application 370. The window manager 342 may manage GUI resources used on the screen. The multimedia manager 343 may grasp formats necessary to play media files and use a codec appropriate for a format to perform encoding or decoding on media files. The resource manager 344 may manage the source code or memory space of the application 370. The power manager 345 may manage, e.g., the battery capability or power and provide power information necessary for the operation of the electronic device. According to an embodiment of the present invention, the power manager 345 may interwork with a basic input/output system (BIOS). The database manager 346 may generate, search, or vary a database to be used in the applications 370. The package manager 347 may manage installation or update of an application that is distributed in the form of a package file.

The connectivity manager 348 may manage, e.g., wireless connectivity. The notification manager 349 may provide an event, e.g., arrival message, appointment, or proximity alert, to the user. The location manager 350 may manage, e.g., locational information on the electronic device. The graphic manager 351 may manage, e.g., graphic effects to be offered to the user and their related user interface. The security manager 352 may provide system security or user authentication, for example. According to an embodiment of the present invention, the middleware 330 may include a telephony manager for managing the voice or video call function of the electronic device or a middleware module able to form a combination of the functions of the above-described elements. According to an embodiment of the present invention, the middleware 330 may provide a module specified according to the type of the operating system. The middleware 330 may dynamically omit some existing components or add new components. The API 360 may be a set of, e.g., API programming functions and may have different configurations depending on operating systems. For example, in the case of Android or iOS, one API set may be provided per platform, and in the case of Tizen, two or more API sets may be offered per platform.

The application 370 may include an application that may provide, e.g., a home 371, a dialer 372, an SMS/MMS 373, an instant message (IM) 374, a browser 375, a camera 376, an alarm 377, a contact 378, a voice dial 379, an email 380, a calendar 381, a media player 382, an album 383, or a clock 384, a health-care (e.g., measuring the degree of workout or blood sugar), or provision of environmental information (e.g., provision of air pressure, moisture, or temperature information). According to an embodiment of the present invention, the application 370 may include an information exchanging application supporting information exchange between the electronic device and an external electronic device. Examples of the information exchange application may include, but is not limited to, a notification relay application for transferring specific information to the external electronic device, or a device management application for managing the external electronic device. For example, the notification relay application may transfer notification information generated by other application of the electronic device to the external electronic device or receive notification information from the external electronic device and provide the received notification information to the user. For example, the device management application may install, delete, or update a function (e.g., turn-on/turn-off the external electronic device (or some elements) or adjusting the brightness (or resolution) of the display) of the external electronic device communicating with the electronic device or an application operating on the external electronic device. According to an embodiment of the present invention, the application 370 may include an application (e.g., a health-care application of a mobile medical device) designated according to an attribute of the external electronic device. According to an embodiment of the present invention, the application 370 may include an application received from the external electronic device. At least a portion of the program module 310 may be implemented (e.g., executed) in software, firmware, hardware (e.g., the processor 210), or a combination of at least two or more thereof and may include a module, program, routine, command set, or process for performing one or more functions.

According to various embodiments, an electronic device may communicate with a vehicle device and transmit or receive information to/from the vehicle device.

According to various embodiments, a vehicle device comprises a display, at least one or more sensors, a communication unit configured to communicate with an external electronic device, a memory configured to store at least one first application, and a processor configured to display first display information according to execution of the first application stored in the memory on a first area on the display, perform control to transfer vehicle-related context information to the electronic device based on information obtained by the at least one or more sensors and, if information related to a second application corresponding to the vehicle-related context information is received from the electronic device, display the received information on a second area on the display.

According to an embodiment, the processor may be configured to generate the second display information according to a predesignated vehicle display condition using the received information and display the generated second display information on the second area.

According to an embodiment, the predesignated vehicle display condition may include at least one of an image type set not to be displayed on the display, a color type set not to be displayed on the display, a size and length of text displayable on the display, a type and size of an object displayable on the display, the number of objects displayable on the display, and a location displayable on the display.

According to an embodiment, the vehicle-related context information may include any one of vehicle state information, vehicle location information, vehicle destination information, vehicle boarding information, vehicle driving state information, vehicle external signal reception information, and in-vehicle use service information.

According to an embodiment, the vehicle display information may be a card-type object, and the card-type object may include an application icon area, a title area, and a details area corresponding to the vehicle display information.

According to various embodiments, an electronic device comprises a memory configured to store commands to execute at least one or more applications, a communication unit configured to communicate with a vehicle device, and a processor electrically connected with the communication unit, wherein the processor is configured to, when vehicle-related context information is received from the vehicle device, perform a function corresponding to the vehicle-related context information using an application associated with the vehicle-related context information among the at least one or more applications, transmit first information according to a result of performing the function to the vehicle device, when a first request based on the first information is received from the vehicle device, perform a second function corresponding to the first request using the first application, and transmit second information according to a result of performing the second function to the vehicle device.

According to an embodiment, the vehicle-related context information may include any one of vehicle state information, vehicle location information, vehicle destination information, vehicle boarding information, vehicle driving state information, vehicle external signal reception information, and in-vehicle use service information.

According to an embodiment, the application associated with the vehicle-related context information may include at least one of a vehicle fueling or charging application, a vehicle maintenance application, a smart home application, a parking lot application, a work-related application, a weather application, a scheduler application, a music application, a location information application, a product ordering application, a parking lot payment application, a navigation application, a call application, and a notification application.

Figure 4:
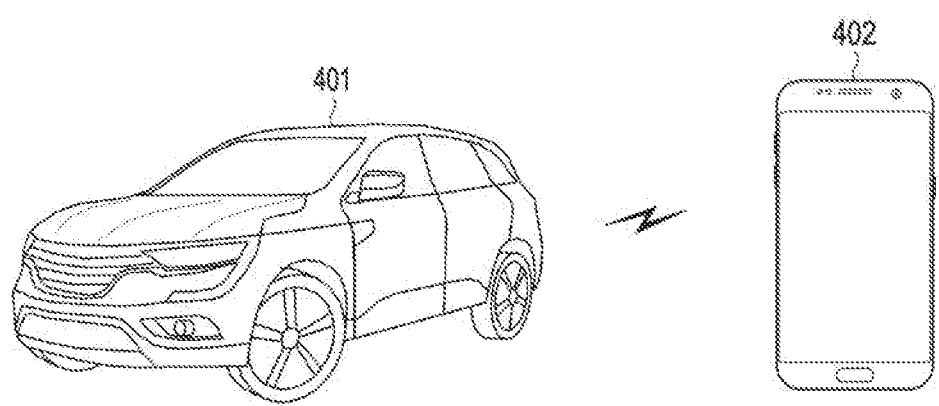
FIG. 4 is a view illustrating an example vehicle device and an example electronic device according to various embodiments.

FIG. 4 is a view illustrating an example vehicle device and an example electronic device according to various embodiments.

Referring to FIG. 4, a vehicle device 401 may display an execution screen of a first application stored in a vehicle. The vehicle device 401 may generate vehicle-related context information using sensor information received at least one or more sensors. The vehicle device 401 may transmit the vehicle-related context information to an electronic device 402. The vehicle device 401 may receive information related to a second application corresponding to the vehicle-related context information from the electronic device 402. The vehicle device 401 may display the information received from the electronic device 402, along with the first application execution screen. According to various embodiments, the vehicle device 401 may generate second display information meeting a predesignated vehicle display condition using the information received from the electronic device 402 and display the generated second display information, along with the first application execution screen.

According to various embodiments, the predesignated vehicle display condition may include at least one of an image type set not to be displayed on the display, a color type set not to be displayed on the display, a size and length of text displayable on the display, a type and size of object displayable on the display, the number of objects displayable on the display, and a location displayable on the display. According to an embodiment, the predesignated vehicle display condition may be a condition corresponding to a driver distraction regulation designated in the national highway traffic safety administration (NHTSA). According to various embodiments, the predesignated vehicle display condition may include various display conditions, such as prohibiting display of dynamic images, prohibiting display of horizontal or vertical scrolling text, allowing only a single 20 word or less text block to be popped-up, prohibiting flashing upon use of a progress bar, prohibiting changing colors, prohibiting use of moving elements, and maintaining a front image-to-rear image contrast ratio of 7:1, a minimum letter height of 4.3 mm, and a minimum horizontal/vertical icon size of 4.2 mm.

The electronic device 402 may receive vehicle-related context information from the vehicle device 401. Upon receiving the vehicle-related context information from the vehicle device 401, the electronic device 402 may search for an application associated with the vehicle-related context information among at least one or more applications. The electronic device 402 may perform a function corresponding to the vehicle-related context information using each of the applications searched for. The electronic device 402 may transmit pieces of information as per a result of performing the function by each of the searched-for applications to the vehicle device 401. The electronic device 402 may receive a request for another function based on the pieces of information as per the result of performing the function by each of the searched-for applications from the vehicle device 401. The electronic device 402 may perform other function as requested and transmit pieces of information as per a result of performing the other function to the vehicle device 401.

Figure 5:
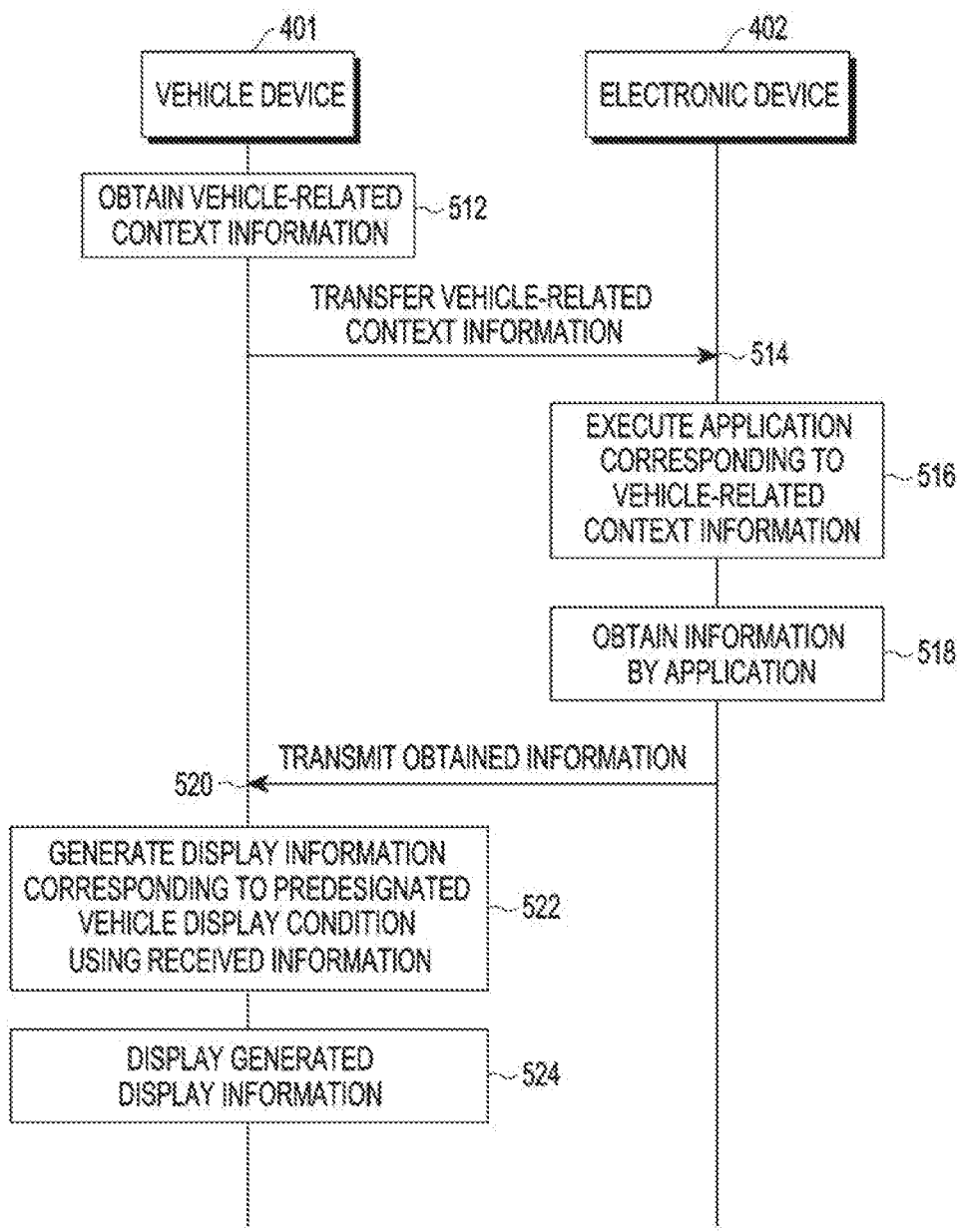
FIG. 5 is a flowchart illustrating operations of a vehicle device and an electronic device according to various embodiments.

FIG. 5 is a flowchart illustrating operations of a vehicle device 401 and an electronic device 402 according to various embodiments.

Referring to FIG. 5, the vehicle device 401 may obtain vehicle-related context information through at least one or more pieces of sensing information in operation 512. According to various embodiments, the vehicle-related context information may include at least one of vehicle information, people-on-board information, driving state information, and in-vehicle use service information. According to an embodiment, the vehicle information may include vehicle location information and vehicle state information. The people-on-board information may include information related to the driver on board or information related to the driver and each passenger. The driving state information may include one of pieces of information indicating the vehicle driving state, such as before departure, while driving, stopping, or parking. The in-vehicle use service information may include information about the service being used by people on board in the vehicle.

The vehicle device 401 may transfer the vehicle-related context information to the electronic device 402 in operation 514. According to various embodiments, the vehicle device 401 may transmit the vehicle-related context information to the electronic device 402 via, e.g., short-range wireless communication. According to an embodiment, the short-range wireless communication may be at least one of Wi-Fi, Bluetooth, or infrared communication. Besides, other communication schemes may be used as long as they are able to transmit information between the vehicle device 401 and the electronic device 402 in vehicle.

Upon receiving the vehicle-related context information, the electronic device 402 may run an application corresponding to the vehicle-related context information in operation 516. According to various embodiments, the electronic device 402 may search for an application associated with the vehicle-related context information among at least one or more applications previously stored. The electronic device 402 may run each of the applications searched for.

The electronic device 402 may obtain information by the application in operation 518. According to various embodiments, the electronic device 402 may perform a function corresponding to the vehicle-related context information using the running application and obtain information according to a result of performing the function. The electronic device 402 may transfer the obtained information to the vehicle device 401 in operation 520.

In operation 522, the vehicle device 401 may generate display information (hereinafter, 'second display information') meeting a predesignated vehicle display condition using the information received from the electronic device 402. The vehicle device 401 may display the generated second display information on the display in operation 524. According to various embodiments, the vehicle device 401 may display the generated second display information along with first display information related to the application (hereinafter, a 'first application') of the vehicle device 401.

Figure 6A:
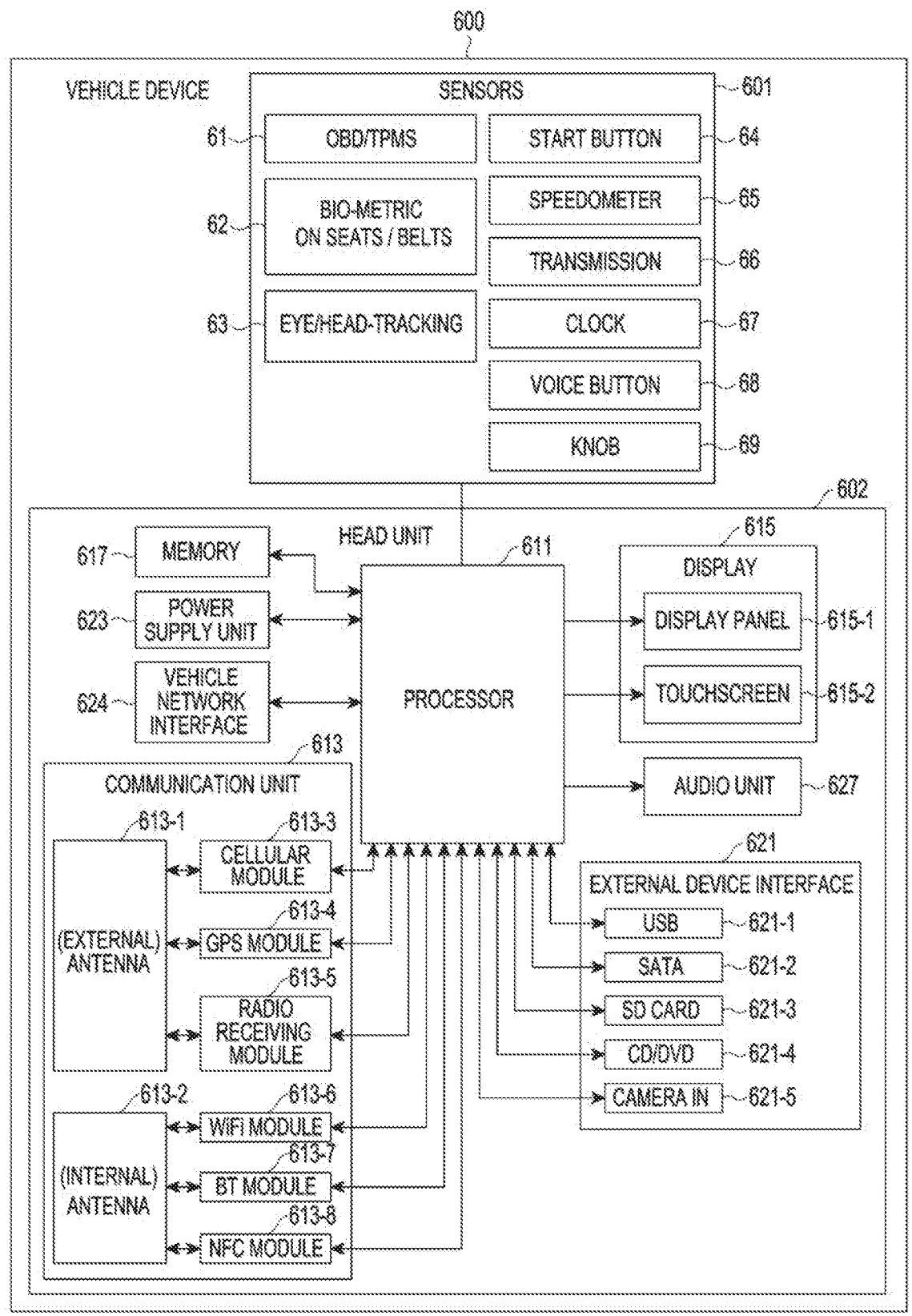
FIG. 6A is a block diagram illustrating a vehicle device according to various embodiments.

FIG. 6A is a block diagram illustrating a vehicle device according to various embodiments.

Referring to FIG. 6A, a vehicle device 600 may include at least one or more sensors 601 and a head unit 602. The at least one or more sensors 601 may include various sensors to perform sensing operation in the vehicle, and each of the sensors may be disposed in a respective sensing position in the vehicle. The head unit 602 may be disposed at a front portion of the driver's seat in the vehicle body.

At least one or more sensors may include all or some of an on board diagnostics (OBD)/tire pressure monitoring system (TPMS) 61, a bio-metric/on seats/belts sensor 62, an eye/head-tracking sensor 63, a start button 64, a speedometer 65, a transmission 66, a clock 67, a voice button 68, and a knob 69. Besides, at least one or more sensors 601 may further include other sensors capable of sensing various pieces of information in vehicle.

The OBD may be a vehicle monitoring module that may monitor systems related to driving in vehicle and determine a failure log. The TPMS may be a tire pressure monitoring sensor and may be equipped with, e.g., a vehicle radio wave identification sensor to detect the pressure and temperature of the tire. The bio-metric sensor may be a biometric sensor. The biometric sensor may sense the user's biometric information such as fingerprint or iris. The on seats sensor may detect any person on a vehicle seat. The belts sensor may detect whether a person on board has fastened a seat belt. The eye/head-tracking sensor 63 may track the driver's or passenger's eye and head state and sense whether the driver or passenger is nodding off using results of tracking. The start button sensor 64 may detect whether the vehicle has started based on, e.g., whether the vehicle start button has been pressed. The speedometer 65 may detect the driving speed of the vehicle. The transmission 66 may detect whether a gear shift has occurred and which gear has shifted. The clock 67 may be a clock sensor which may provide a reference clock. The voice button 68 may be a voice recognition sensor capable of recognizing voice. The knob 69 may be a sensor disposed on the handle of the vehicle door and may recognize whether the driver has grabbed the handle and the fingerprint of the hand on the handle.

The head unit 602 may include a processor 611, a communication unit 613, a display 615, a memory 617, an external device interface 621, a power supply unit 623, and a vehicle network interface 624, an audio unit 627.

The processor 611 may obtain vehicle-related context information based on information obtained by at least one of at least one or more sensors 601 and other modules or components in vehicle (e.g., the communication unit 613, the display 615, the memory 617, the external device interface 621, the power supply unit 623, and the vehicle network interface 624, the audio unit 627). The processor 611 may perform control to transfer the obtained vehicle-related context information to the electronic device 402 and, upon receiving information related to an application (hereinafter, a 'second application') corresponding to the vehicle-related context information from the electronic device 402, perform control to display the received information on the display 615. According to an embodiment, the processor 611 may generate second display information meeting a predesignated vehicle display condition using the received information and display the generated second display information on the display. According to various embodiments, the processor 611 may display the generated second display information on a second area distinguished from a first area displaying the first display information related to the first application executed by the processor 611 among the areas of the display 615.

The communication unit 613 may include at least one or more antennas and at least one or more communication modules. According to an embodiment, the at least one or more antennas may include at least one of an external antenna 613-1 and an internal antenna 613-2. At least one or more communication modules may include at least one of a cellular module 613-3, a GPS module 613-4, a radio module 613-5, a Wi-Fi module 613-6, a Bluetooth (BT) module 613-7, and an NFC module 613-8. Other communication modules may also be added.

The display 615 may include a display panel 615-1 and a touchscreen 615-2. The display 615 may display information related to the second application corresponding to the vehicle-related context information from the electronic device 402 under the control of the processor 611. According to various embodiments, the display 615 may display a first area and a second area. The first area may be an area to display first display information related to the first application executed by the processor 611, and the second area may be an area to display second display information meeting a predesignated vehicle display condition generated by the processor 611 using information related to the second application received corresponding to the vehicle-related context information from the electronic device 402.

According to various embodiments, the display 615 may include one or more displays. According to an embodiment, the display 615 may include a center information display (CID) and may, in addition to the center information display, include at least one or more displays. The center information display may be disposed in the front center of the vehicle, and each of the at least one or more display may be disposed corresponding to the position of each seat. According to an embodiment, the at least one or more display may include at least one of a first display disposed corresponding to the driver's seat, a second display disposed corresponding to the passenger seat, and a third display disposed corresponding to the back seat. According to various embodiments, the processor 611 may perform control to display the display information on any one or more of the center information display, the first display, the second display, and the third display depending on whether a person sits on each seat. According to an embodiment, in a case where a person is only on the driver's seat, the processor 611 may perform control to display the display information on any one of the center information display and the first display. According to an embodiment, in a case where a person is only on the back seat, the processor 611 may perform control to display the display information on any one of the center information display and the first display. Other various display schemes may be possible as well.

The memory 617 may store at least one or more applications executable by the processor 611 of the vehicle device 600 and commands capable of executing the at least one or more applications.

The external device interface 621 may provide an interface connectable with an external device. The external device interface 621 may include a USB interface 621-1, a serial advanced technology attachment (SATA) interface 621-2, an SD card interface 621-3, a CD/DVD interface 621-4, and a camera interface 621-5.

The power supply unit 623 may supply power to the head unit 602. The vehicle network interface 624 may provide an interface between various parts and devices in the vehicle.

Figure 6B:
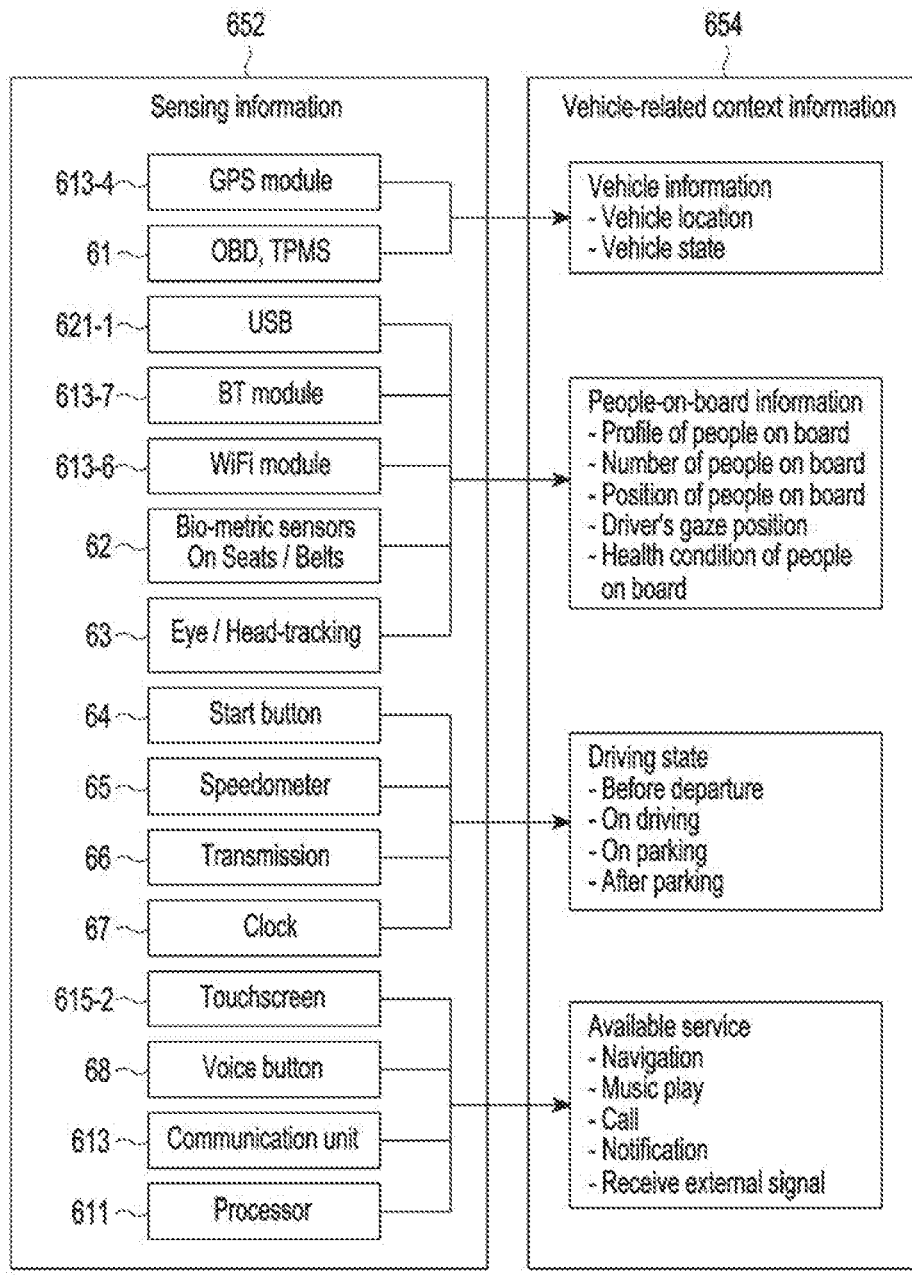
FIG. 6B is a view illustrating vehicle-related context information obtained by a vehicle device according to various embodiments.

FIG. 6B is a view illustrating vehicle-related context information obtained by a vehicle device according to various embodiments.

Referring to FIG. 6B, the vehicle device 600 may obtain vehicle-related context information 654 based on sensing information 652 obtained by at least one of at least one or more sensors 601 and other modules or components in vehicle (e.g., the processor 611, the communication unit 613, the display 615, the memory 617, the external device interface 621, the power supply unit 623, and the vehicle network interface 624, the audio unit 627). According to various embodiments, the vehicle-related context information 654 may include at least one of vehicle information, people-on-board information, driving state, and use service.

According to various embodiments, the vehicle device 600 may obtain vehicle information using at least one of the GPS module 613-4 and the OBD/TPMS 61. According to an embodiment, the vehicle device 600 may further use a module in addition to at least one of the GPS module 613-4 and the OBD/TPMS 61 upon obtaining the vehicle information. According to an embodiment, the vehicle information may include at least one of a vehicle location and a vehicle state. The vehicle device 600 may obtain the vehicle location using the GPS module 613-4. The vehicle location may include information related to the location of the vehicle. According to various embodiments, the information related to the location of the vehicle may include information about the current location of the vehicle and information about the place corresponding to the current location of the vehicle. The place information may include information about the home, company, destination, and if the place is a place other than the home, company, or destination, information about the other place. The vehicle device 600 may obtain the vehicle state using the OBD/TPMS 61. The vehicle state may include at least one of the state of fuel and the state of maintenance of the vehicle. The fuel state may include at least one of the state of fueling or the charging state of the battery. The state of maintenance may include the state of at least one or more devices in the vehicle, such as the state of tire air pressure and may further include information about whether a repair is needed for at least one or more devices in the vehicle.

According to various embodiments, the vehicle device 600 may obtain people-on-board information using at least one of the USB 621-1, the BT module 613-7, the Wi-Fi module 613-6, the bio-metric/on seats/belts sensor 62, and the eye/head-tracking sensor 63. According to an embodiment, the vehicle device 600 may further use a module in addition to at least one of the USB 621-1, the BT module 613-7, the Wi-Fi module 613-6, the bio-metric/on seats/belts sensor 62, and the eye/head-tracking sensor 63 upon obtaining the people-on-board information. According to an embodiment, the people-on-board information may include at least one of the profile, number, position, and state of people on board. According to an embodiment, the vehicle device 600 may receive the profile of the person on board, which corresponds to the user of each electronic device, from at least one electronic device in the vehicle using at least one of the USB 621-1, the BT module 613-7, and the Wi-Fi module 613-6 or receive the user profile of each electronic device and obtain the profile of the people on board using the received user profile. The profile of the people on board may include at least one of the name, age, and family relation of the people on board and information on whether the people on board are licensed to drive and may further include at least one piece of information of whether the people on board are the car owners, whether the people on board are the family of the car owner, and whether the people on board are authorized to drive the car. In the case of obtaining the profile of the people on board based on the profile of the user of each electronic device, the vehicle device 600 may obtain at least one of the name, age, and family relation of the user of each electronic device, and whether the person is licensed to drive from the profile of the user of each electronic device and obtain the profile of the people on board based thereupon. According to various embodiments, the vehicle device 600 may detect the people on the seats of the vehicle, biometric information about the people on board in the vehicle or whether the people on board fasten the belts using the bio-metric/on seats/belts sensor 62, thereby obtaining any one of the number, position, and health condition of the people on board. According to an embodiment, the vehicle device 600 may obtain information about whether the number of people on board is one or two, obtain information about which seats in the vehicle the people sit, e.g., the driver's seat, passenger seat, or back seats, and obtain biometric information about the people on board, such as blood pressure, blood sugar, or heart rate. According to various embodiments, the vehicle device 600 may track the driver's or passenger's eye and head state using the eye/head-tracking sensor 63 and obtain information about the gaze of at least one or more of the driver and the passenger and whether they are nodding off using the results of tracking.

According to various embodiments, the vehicle device 600 may obtain driving state information using at least one of the start button 64, the speedometer 65, the transmission 66, and the clock 67. According to an embodiment, the vehicle device 600 may use another module in addition to at least one of the start button 64, the speedometer 65, the transmission 66, and the clock 67 upon obtaining the driving state information. According to an embodiment, the driving state information may include at least one of the before-departure state, driving state, parking state, and after-parking state. According to an embodiment, the vehicle device 600 may obtain information about whether the vehicle is in the before-departure state, driving state, parking state, or after-parking state using at least one of whether the vehicle started sensed by the start button sensor 64, the vehicle driving speed sensed by the speedometer 65, a gear shift sensed by the transmission 66, and the time detected by the clock 67.

According to various embodiments, the vehicle device 600 may obtain use service information using at least one of the touchscreen 615-2, voice button 68, communication unit 613, and processor 611. According to an embodiment, the vehicle device 600 may use another module in addition to at least one of the touchscreen 615-2, voice button 68, communication unit 613, and processor 611 upon obtaining the use service information. According to an embodiment, the use service information may be a service being used by at least one person on board in the vehicle. According to various embodiments, the services available in vehicle may include at least one of a navigation service, a music play service, a call service, a notification service, or an external signal receiving service. Also possible are other services available via the electronic device or vehicle device in the vehicle. According to an embodiment, the vehicle device 600 may execute a navigation application using the processor 611 and display a navigation screen according to execution of the navigation application on the touchscreen 615-2. According to an embodiment, the vehicle device 600 may execute a music play application using the processor 611 and output music according to execution of the music play application through, e.g., a speaker. According to an embodiment, the vehicle device 600 may execute a call application using the processor 611 and the communication unit 613 and perform call according to execution of the call application. According to an embodiment, the vehicle device 600 may perform a notification service to receive and provide a notification generated from the electronic device using the processor 611 and the communication unit 613. According to an embodiment, the vehicle device 600 may perform the function of receiving an external signal from an external communication device using the processor 611 and the communication unit.

According to various embodiments, a method of display on a vehicle device comprises displaying first display information associated with a first application stored in a memory on a first area on a display, performing control to transfer vehicle-related context information to the electronic device based on information obtained by the at least one or more sensors, and if information related to a second application corresponding to the vehicle-related context information is received from the electronic device, performing control to display second display information on a second area on the display using the received information.

According to an embodiment, the method may further comprise converting the received display information into vehicle display information according to a predesignated vehicle display condition.

According to an embodiment, the predesignated vehicle display condition may include at least one of an image type set not to be displayed on the display, a color type set not to be displayed on the display, a size and length of text displayable on the display, a type and size of an object displayable on the display, the number of objects displayable on the display, and a location displayable on the display.

According to an embodiment, the vehicle-related context information may include any one of vehicle state information, vehicle location information, vehicle destination information, vehicle boarding information, vehicle driving state information, vehicle external signal reception information, and in-vehicle use service information.

According to an embodiment, the vehicle display information may be a card-type object, and the card-type object may include an application icon area, a title area, and a details area corresponding to the vehicle display information.

Figure 7:
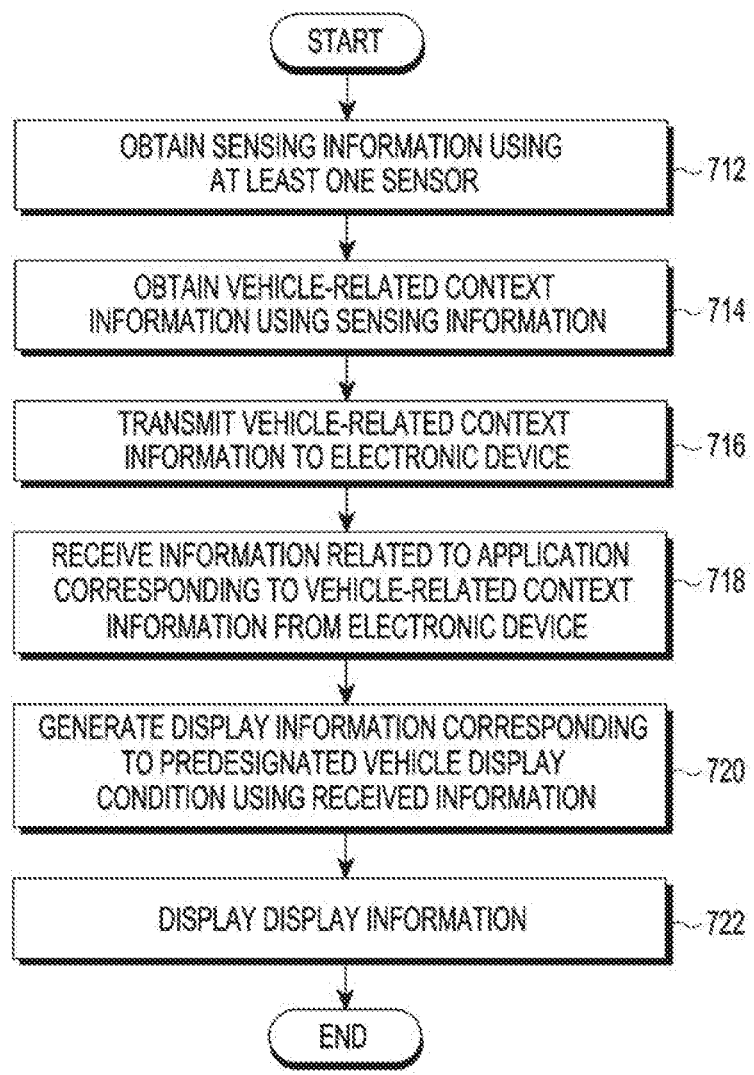
FIG. 7 is a flowchart illustrating operations of a vehicle device according to various embodiments.

FIG. 7 is a flowchart illustrating operations of a vehicle device according to various embodiments.

Referring to FIG. 7, the vehicle device 600 may obtain sensing information using at least one or more sensors in operation 712. According to various embodiments, the vehicle device 600 may obtain a failure log and results of monitoring in-vehicle systems related to driving using the OBD, obtain the pressure and temperature of the tires using the TPMS, obtain the user's biometric information, such as fingerprints or iris sensed using the bio-metric sensor, obtain information about whether people sit on the seats of the vehicle using the on seats sensor, obtain information about whether the people on board have fastened seat belts using the belts sensor, obtain information about whether the driver or passenger is nodding off and results of tracking the driver's or passenger's eye and head state using the eye/head-tracking sensor 63, obtain information about whether the vehicle starts using the start button sensor 64, obtain information about the vehicle driving speed detected using the speedometer 65, obtain information about whether there is a gear shift in the vehicle and information about the gear shifted using the transmission 66, and obtain reference clock information using the clock sensor 67.

The vehicle device 600 may obtain vehicle-related context information using the sensing information in operation 714. According to various embodiments, the vehicle-related context information may include at least one of vehicle information, people-on-board information, driving state information, and use service information. Besides, the vehicle-related context information may further include other information indicating the contexts related to the vehicle. According to an embodiment, the vehicle information may include at least one of fueling or charging information or vehicle maintenance information. The vehicle location information may include information about the current location of the vehicle. The vehicle destination information may include information about the location of the destination of the vehicle. The people-on-board information may include information about the driver on board or information about passengers on board. The vehicle driving state information may include at least one state of an after-boarding-before-driving state, a driving state, and an after-driving-parking state. The vehicle external signal reception information may include whether the vehicle receives an external signal and the kind of the received external signal. The in-vehicle use service information may include information about the service being used in the vehicle.

The vehicle device 600 may transmit the vehicle-related context information to the electronic device in operation 716. In operation 718, the vehicle device 600 may receive second application-related information corresponding to the vehicle-related context information from the electronic device.

Upon receiving the application-related information corresponding to the vehicle-related context information from the electronic device, the vehicle device 600 may generate display information (second display information) meeting a predesignated vehicle display condition using the received information in operation 720.

The vehicle device 600 may display the generated display information (second display information) on the display 615. According to various embodiments, the vehicle device 600 may display the generated second display information on a second area distinguished from a first area displaying the first display information related to the first application executed by the processor 611 among the areas of the display 615.

According to various embodiments, a method of transmitting information on an electronic device comprises receiving vehicle-related context information from a vehicle device, performing a first function corresponding to the vehicle-related context information using an application associated with the vehicle-related context information among at least one or more applications and transmitting first information according to a result of performing the first function to the vehicle device, and when a first request based on the first information is received from the vehicle device, performing a second function corresponding to the first request using the application associated with the vehicle-related context information and transmitting second information according to a result of performing the second function to the vehicle device.

According to an embodiment, the vehicle-related context information may include any one of vehicle state information, vehicle location information, vehicle destination information, vehicle boarding information, vehicle driving state information, vehicle external signal reception information, and in-vehicle use service information.

According to an embodiment, the application associated with the vehicle-related context information may include at least one of a vehicle fueling or charging application, a vehicle maintenance application, a smart home application, a parking lot application, a work-related application, a weather application, a scheduler application, a music application, a location information application, a product ordering application, a parking lot payment application, a navigation application, a call application, and a notification application.

Figure 8:
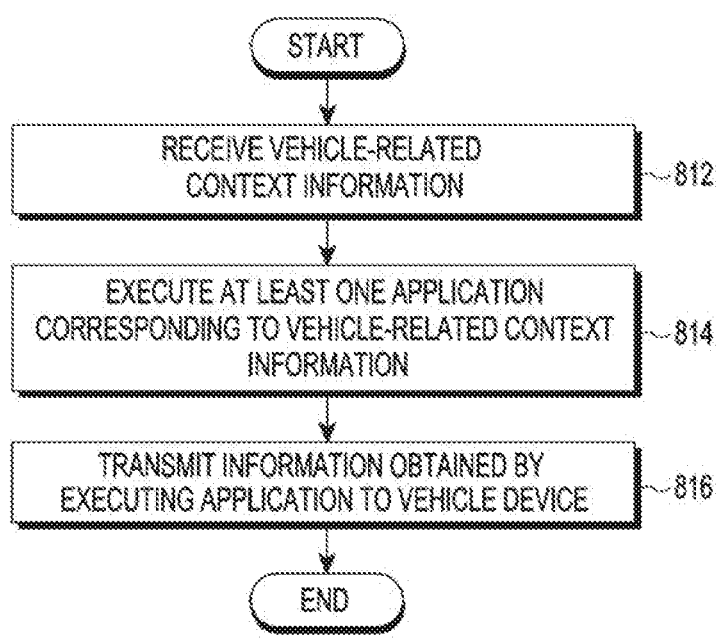
FIG. 8 is a flowchart illustrating operations of an electronic device according to various embodiments.

FIG. 8 is a flowchart illustrating operations of an electronic device according to various embodiments.

Referring to FIG. 8, the electronic device 402 may receive vehicle-related context information from the vehicle device 600 in operation 812.

Upon receiving the vehicle-related context information, the electronic device 402 may run at least one or more applications corresponding to the vehicle-related context information in operation 814. According to various embodiments, the electronic device 402 may search for an application associated with the vehicle-related context information among at least one or more applications previously stored. The electronic device 402 may execute each of the at least one or more applications searched for.

The electronic device 402 may obtain information according to executing the application in operation 814. According to various embodiments, the electronic device 402 may perform a function corresponding to the vehicle-related context information using the running application and obtain information according to a result of performing the function. The electronic device 402 may transfer the obtained information to the vehicle device 401 in operation 816.

Figure 9:
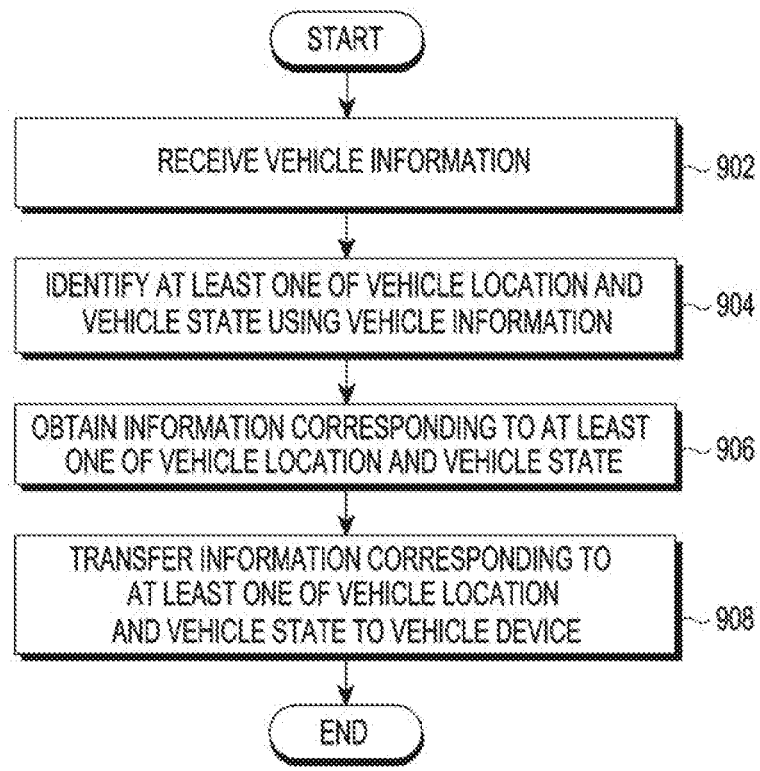
FIG. 9 is a flowchart illustrating operations according to reception of vehicle information on an electronic device according to various embodiments.

FIG. 9 is a flowchart illustrating operations when an electronic device receives vehicle information according to various embodiments.

Referring to FIG. 9, the electronic device 402 may receive vehicle information in operation 902. According to various embodiments, the vehicle information may include at least one of vehicle location information and vehicle state information.

The electronic device 402 may determine at least one of the vehicle location information and the vehicle state information using the vehicle information in operation 904. According to various embodiments, the electronic device 402 may determine the current location and destination of the vehicle using the vehicle location information and determine the fuel state and maintenance state of the vehicle using the vehicle state information.

The electronic device 402 may obtain information related to at least one of the vehicle location information and the vehicle state information in operation 906. According to various embodiments, the electronic device 402 may obtain information corresponding to the vehicle location information using a predesignated application corresponding to the vehicle location information and obtain information corresponding to the vehicle state information using a predesignated application corresponding to the vehicle state information.

The electronic device 402 may transfer, to the vehicle device, information corresponding to at least one of the obtained vehicle location information and vehicle state information in operation 908. According to various embodiments, the electronic device 402 may transmit the information corresponding to at least one of the vehicle location information and vehicle state information via any one of a plurality of communication schemes that enable communication with the vehicle device 600.

Figure 10:
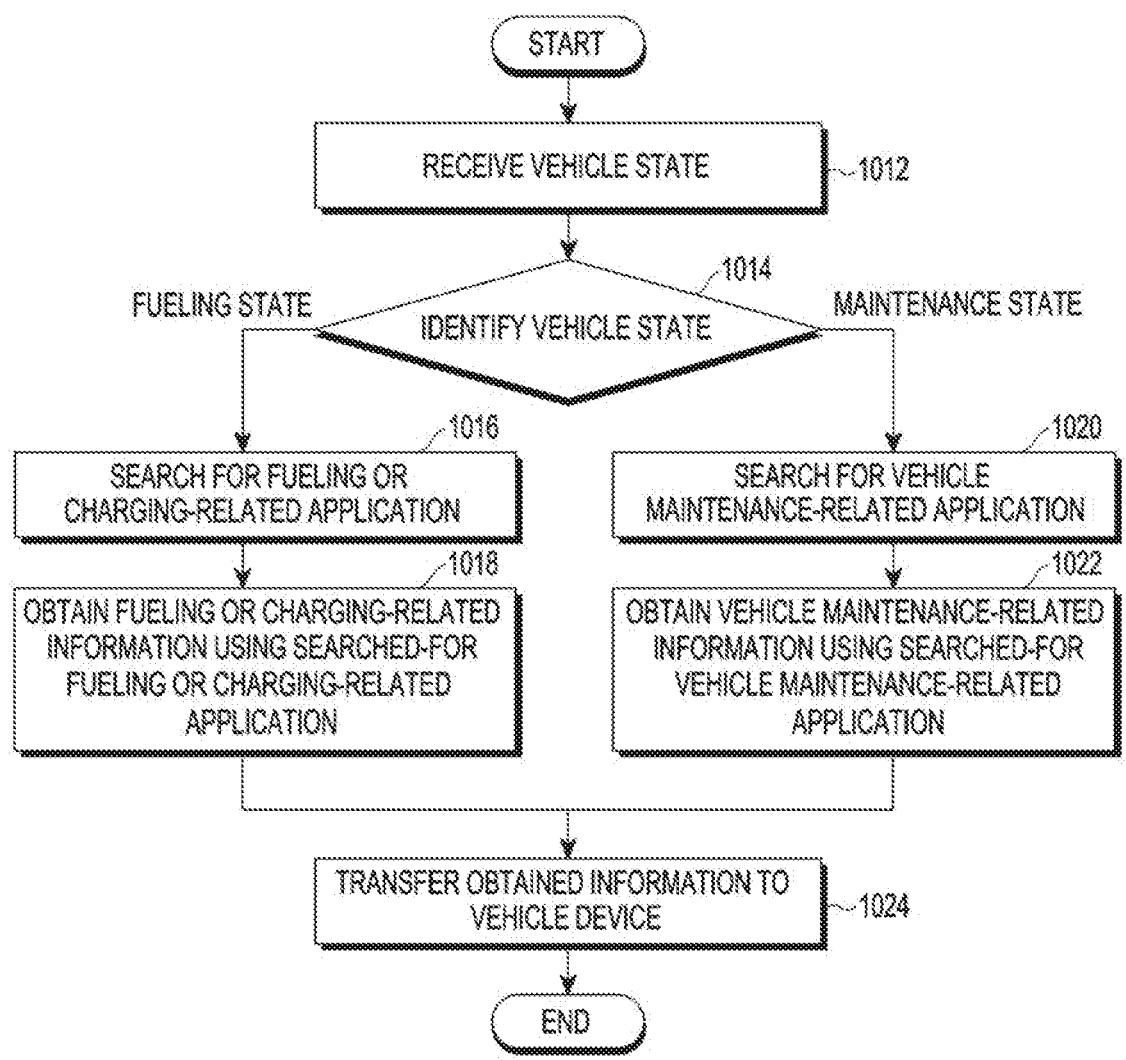
FIG. 10 is a flowchart illustrating operations according to reception of vehicle state information on an electronic device according to various embodiments.

FIG. 10 is a flowchart illustrating operations when an electronic device receives vehicle state information according to various embodiments.

Referring to FIG. 10, the electronic device 402 may receive vehicle state information in operation 1012. According to various embodiments, the vehicle state information may include at least one of the fuel state and the maintenance state.

The electronic device 402 may determine vehicle state information in operation 1014. According to various embodiments, the electronic device 402 may determine the fuel state and the maintenance state using the vehicle state information.

The electronic device 402 may search for a fueling or charging-related application among pre-stored applications according to the fuel state in operation 1016. The electronic device 402 may obtain fueling or charging-related information using the searched-for fueling or charging-related application in operation 1018.

The electronic device 402 may search for a vehicle maintenance-related application among the pre-stored applications according to the maintenance state in operation 1020. The electronic device 402 may obtain vehicle maintenance-related information using the searched-for vehicle maintenance-related application in operation 1022. The electronic device may transmit the obtained information to the vehicle device 600 in operation 1024.

Figure 11:
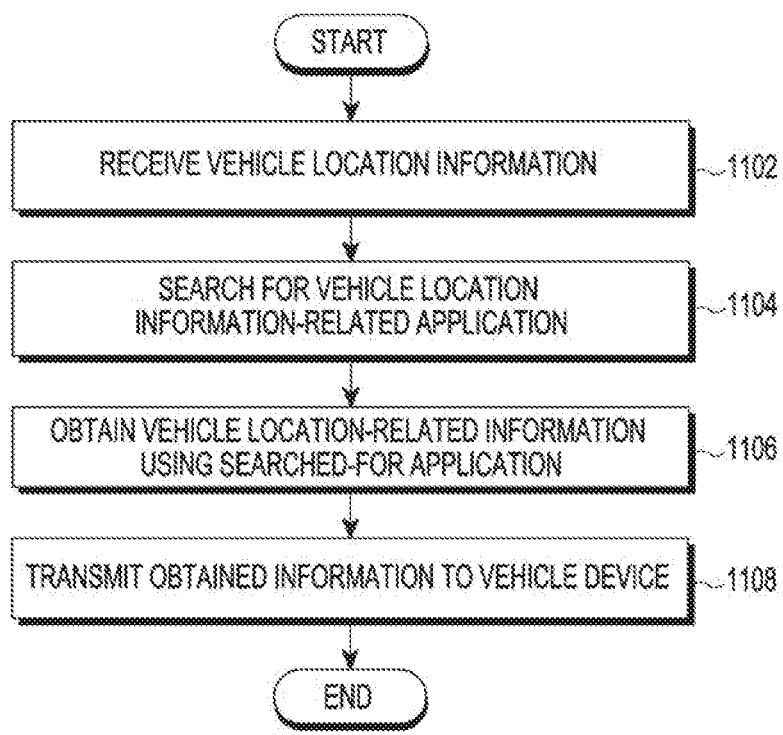
FIG. 11 is a flowchart illustrating operations according to reception of vehicle location information on an electronic device according to various embodiments.

FIG. 11 is a flowchart illustrating operations when an electronic device receives vehicle location information according to various embodiments.

Referring to FIG. 11, the electronic device 402 may receive vehicle location information in operation 1102. According to various embodiments, the vehicle location information may include at least one of information about the current location of the vehicle, information about the destination of the vehicle, and information about the location designated by the user.

The electronic device 402 may search for a vehicle location information-related application in operation 1104. According to various embodiments, the electronic device may search for an application related to the vehicle current location information and an application related to the vehicle destination information and the user-designated location information.

According to an embodiment, the electronic device 402 may determine whether the current location of the vehicle is home or the destination. If the location of the vehicle is home, the electronic device 402 may search for a home-related smart home application among pre-stored applications. If the current location of the vehicle is the destination, the electronic device 402 may search for a destination-related parking lot application among the pre-stored applications.

According to an embodiment, the electronic device 402 may determine the vehicle destination information or the designated location information. The vehicle destination information may be information about the destination where the vehicle intends to go. The designated location information may be information about a designated location for the user to obtain information.

The electronic device 402 may determine whether the destination or designated location of the vehicle is home, company, or a certain place which is not home or company, using the vehicle destination information or designated location information. If the destination of the vehicle is home, the electronic device 402 may search for a home-related application among pre-stored applications. The home-related application may be a smart home application. If the destination of the vehicle is the company, the electronic device 402 may search for a work-related application among the pre-stored applications.

If the destination of the vehicle is the specific place, the electronic device 402 may search for a specific place-related application among the pre-stored applications. The specific place-related application may be a parking lot searching application.

The electronic device 402 may obtain vehicle location information-related information using the searched-for application in operation 1106. According to an embodiment, in a case where a smart home application is searched for, the electronic device 402 may obtain information about smart devices in the home using the smart home application. According to an embodiment, in a case where a work-related application is searched for, the electronic device 402 may obtain work information using the work-related application. According to an embodiment, in a case where a parking lot application is searched for, the electronic device 402 may obtain information about parking lots located around or related to the destination or the specific place using the parking lot application.

The electronic device 402 may transmit the obtained information to the vehicle device 600 in operation 1108. According to various embodiments, the electronic device 402 may transmit the obtained information using any one of a plurality of communication schemes that enable communication with the vehicle device 600.

Figure 12:
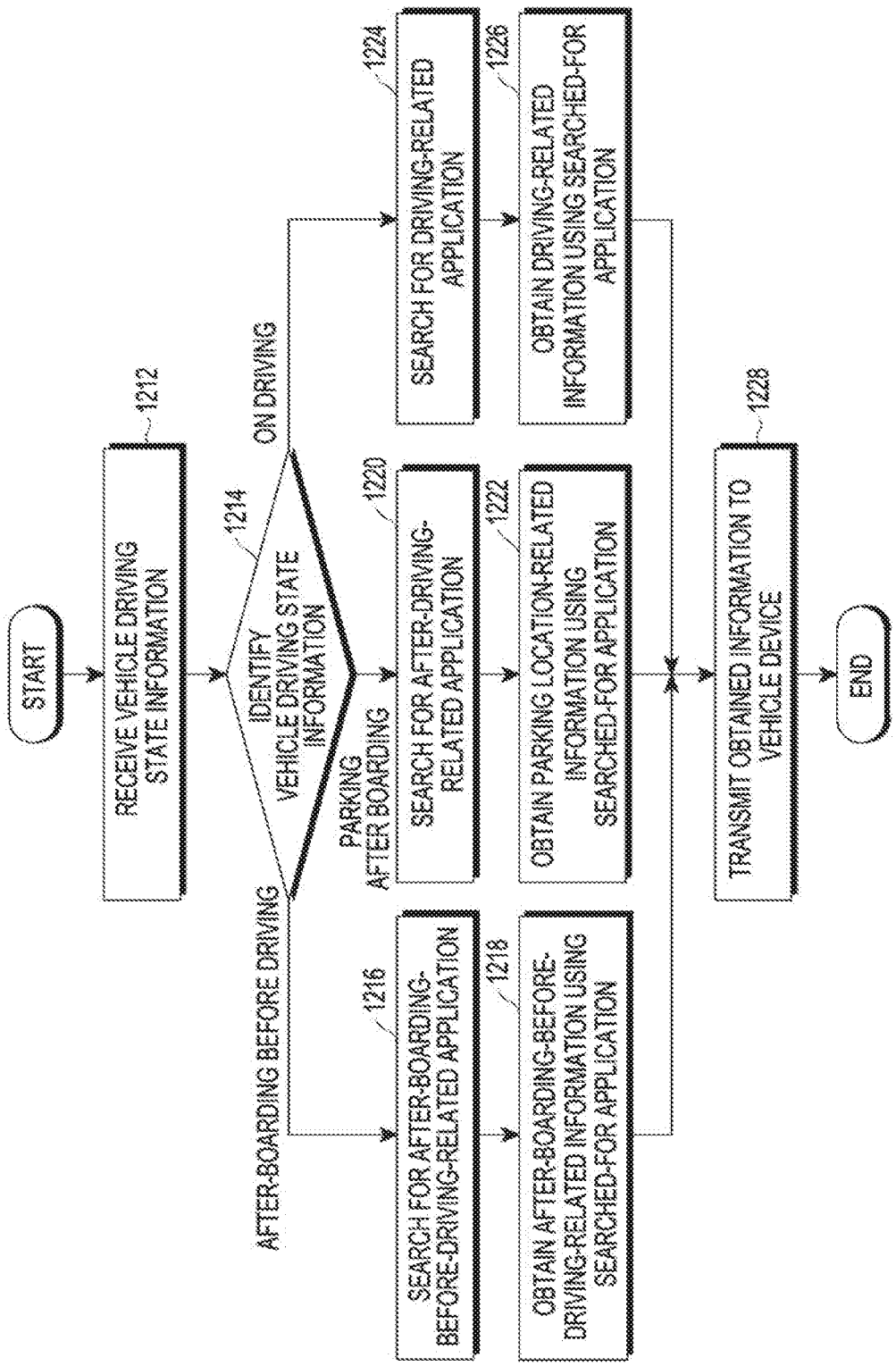
FIG. 12 is a flowchart illustrating operations according to reception of vehicle driving state information on an electronic device according to various embodiments.

FIG. 12 is a flowchart illustrating operations when an electronic device receives vehicle driving state information according to various embodiments.

Referring to FIG. 12, the electronic device 402 may receive vehicle driving state information in operation 1212. According to various embodiments, the vehicle driving state information may include at least one state of an after-boarding-before-driving state, an on-driving state, and an after-driving-parking state.

The electronic device 402 may determine vehicle driving state in operation 1214. According to various embodiments, the electronic device 402 may determine whether the vehicle is in the state of being after people get on board and before starting to drive, driving, or parking after driving.

If the vehicle is in the after-boarding-before driving state, the electronic device 402 may search for an after-boarding-before-driving-related application among pre-stored applications in operation 1216. The after-boarding-before-driving-related application may include at least one of a weather application, a scheduler application, a music application, and a smart home application. The electronic device 402 may obtain after-boarding-before-driving-related information using the searched-for application in operation 1218.

If the vehicle is in the parking-after-driving state, the electronic device 402 may search for a parking-after-driving-related application among the pre-stored applications in operation 1220. The electronic device 402 may obtain parking location-related information using the searched-for application in operation 1222.

If the vehicle is in the driving state, the electronic device 402 may search for a driving-related application among the pre-stored applications in operation 1224. The electronic device 402 may obtain driving-related information using the driving-related application in operation 1226. The electronic device may transmit the obtained information to the vehicle device 600 in operation 1228.

Figure 13:
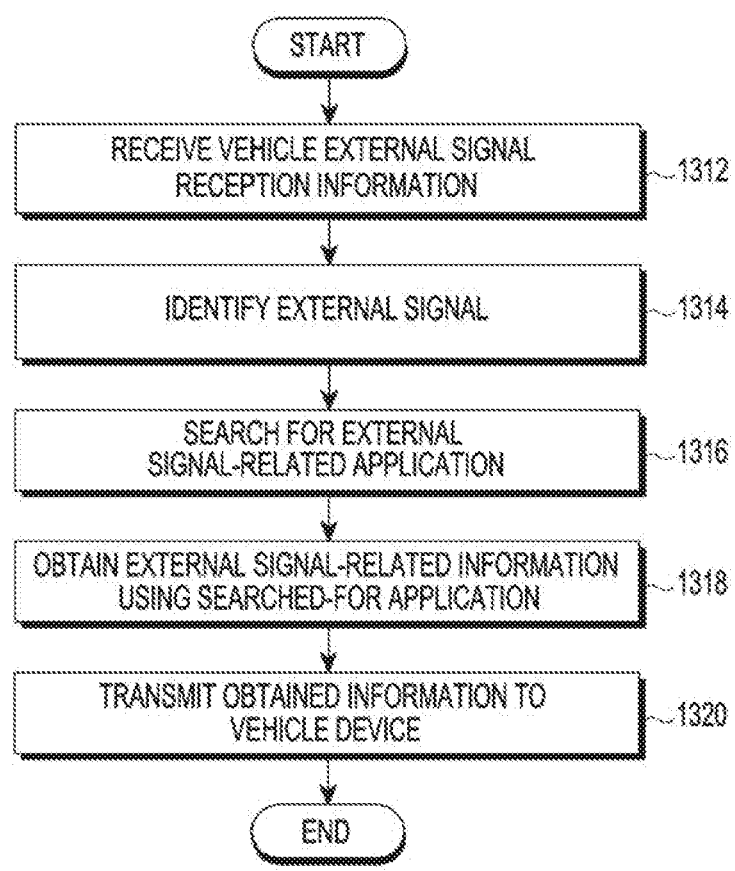
FIG. 13 is a flowchart illustrating operations according to reception of a vehicle's external signal reception information on an electronic device according to various embodiments.

FIG. 13 is a flowchart illustrating operations when an electronic device receives vehicle external signal reception information according to various embodiments.

Referring to FIG. 13, the electronic device 402 may receive vehicle external signal reception information in operation 1312. According to various embodiments, the electronic device 402 may receive external signal reception information, which has been received by the vehicle device 600, from any one of at least one communication module of the vehicle device 600. According to various embodiments, the vehicle external signal reception information may include whether a vehicle external signal is received and the kind of the received external signal. According to various embodiments, the received external signal may be a signal from any one of various stores and payment booths. Various stores may include product shops or ticket offices. The payment booths may include parking fee booths or highway tollbooths. According to various embodiments, the external signal may be transmitted from any place capable of providing external signals to vehicles, other than various stores and payment booths, and the vehicle may receive the external signal transmitted.

The electronic device 402 may determine the external signal in operation 1314. According to various embodiments, the electronic device 402 may determine the kind of the external signal received by the vehicle using the vehicle external signal reception information. According to various embodiments, the electronic device 402 may determine whether the received external signal is one received from any one of a store or a payment booth, determine which one of product shops or ticket offices the external signal has been received from, and determine which one of parking fee payment booths or highway tollbooths the external signal has been received from. According to various embodiments, the electronic device 402 may determine the place which has provided the external signal other than shops or payment booths.

The electronic device 402 may search for an application related to the determined external signal in operation 1316. According to various embodiments, if the external signal is from a product shop, the electronic device 402 may search for a product shop-related application among pre-stored applications. According to an embodiment, the product shop may be a drive-through shop. According to various embodiments, if the external signal is from a parking lot payment booth, the electronic device 402 may search for a parking lot payment-related application among the pre-stored applications.

The electronic device 402 may obtain external signal reception information using the searched-for application in operation 1318. According to various embodiments, the electronic device 402 may obtain product sale-related information using the application related to the product shop related to the external signal. According to various embodiments, the electronic device 402 may obtain parking lot payment-related information using the parking lot payment-related application related to the external signal.

The electronic device 402 may transmit the obtained information to the vehicle device 600 in operation 1320.

Figure 14:
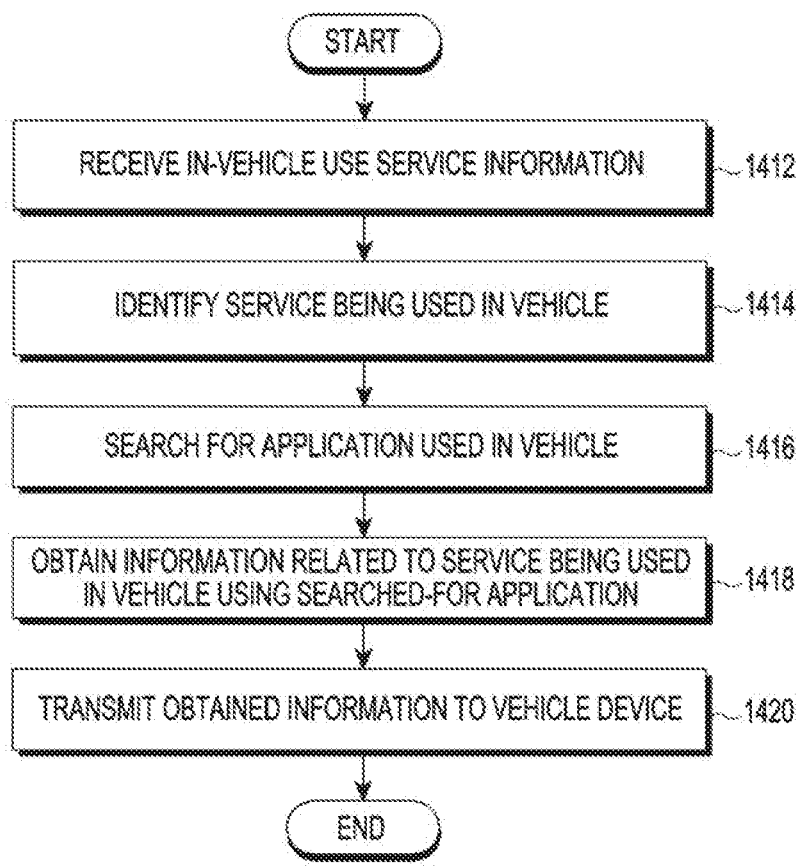
FIG. 14 is a flowchart illustrating operations according to reception of in-vehicle use service information on an electronic device according to various embodiments.

FIG. 14 is a flowchart illustrating operations when an electronic device receives in-vehicle use service information according to various embodiments.

Referring to FIG. 14, the electronic device 402 may receive in-vehicle use service information in operation 1412. According to various embodiments, the in-vehicle use service information may include information about the service being used in the vehicle.

The electronic device 402 may determine the in-vehicle use service information in operation 1414. According to various embodiments, the electronic device 402 may determine the kind of the service being executed among applications stored in the memory of the vehicle. According to various embodiments, the in-vehicle available service may include at least one of a navigation service, a music play service, a call service, and a notification service. According to various embodiments, the in-vehicle available service may further include services using various devices of the vehicle other than the destination search service, music play service, call service, and notification service.

The electronic device 402 may search for an application related to the service being used in the vehicle in operation 1416. According to an embodiment, if the navigation service is being used in the vehicle, the electronic device 402 may search for a navigation application among pre-stored applications. According to an embodiment, if the music play service is being used, the electronic device 402 may search for a music play-related application among the pre-stored applications. According to an embodiment, if the call service is being used, the electronic device 402 may search for a call-related application among the pre-stored applications. If the notification service is being used, the electronic device 402 may determine a notification information providing application.

The electronic device 402 may obtain information related to the service being used in the vehicle using the searched-for application in operation 1418. According to various embodiments, the electronic device 402 may obtain destination-related information using the navigation application. According to various embodiments, the destination-related information may include, e.g., destination location information, destination building information, destination traffic information, and destination entry waiting information. According to various embodiments, the electronic device 402 may obtain music play-related information using the music play-related application. The music play-related information may include, e.g., a music play file or a music play list. According to various embodiments, the electronic device 402 may obtain call-related information using the call-related application. According to an embodiment, the call-related information may include, e.g., phone number information. According to various embodiments, the electronic device 402 may obtain notification information according to generation of notification information using the notification information providing application. The electronic device may transmit the obtained information to the vehicle device 600 in operation 1420.

Figure 15:
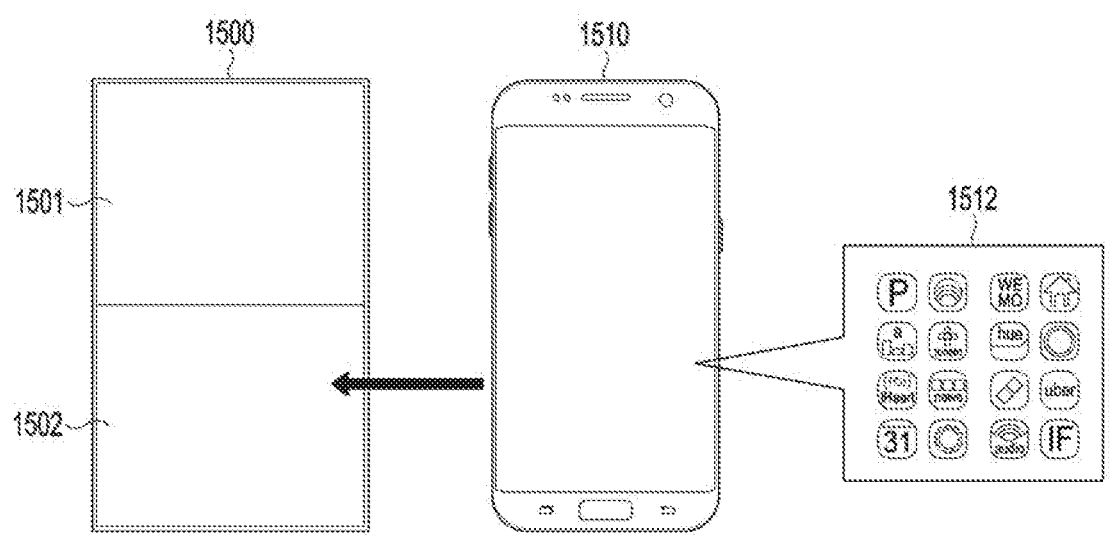
FIG. 15 is a view illustrating a display area in a vehicle device according to various embodiments.

FIG. 15 is a view illustrating a display area in a vehicle device according to various embodiments.

Referring to FIG. 15, a display area 1500 of the vehicle device 600 may include a first area 1501 and a second area 1502.

The first area 1501 may be an area to display first display information related to a first application executed by the vehicle device 600.

The second area 1502 may be an area to display second display information generated by the vehicle device 600 using second application-related information received corresponding to vehicle-related context information from an electronic device 1510. The second display information may be generated to meet a predesignated vehicle display condition.

According to various embodiments, the predesignated vehicle display condition may include at least one of an image type set not to be displayed on the display, a color type set not to be displayed on the display, a size and length of text displayable on the display, a type and size of object displayable on the display, the number of objects displayable on the display, and a location displayable on the display. According to an embodiment, the predesignated vehicle display condition may be a condition corresponding to a driver distraction regulation designated by the NHTSA. According to various embodiments, the predesignated vehicle display condition may include various display conditions, such as prohibiting display of dynamic images, prohibiting display of horizontal or vertical scrolling text, allowing only a single 20 word or less text block to be popped-up, prohibiting flashing upon use of a progress bar, prohibiting changing colors, prohibiting use of moving elements, and maintaining a front image-to-rear image contrast ratio of 7:1, a minimum letter height of 4.3 mm, and a minimum horizontal/vertical icon size of 4.2 mm.

Figure 16:
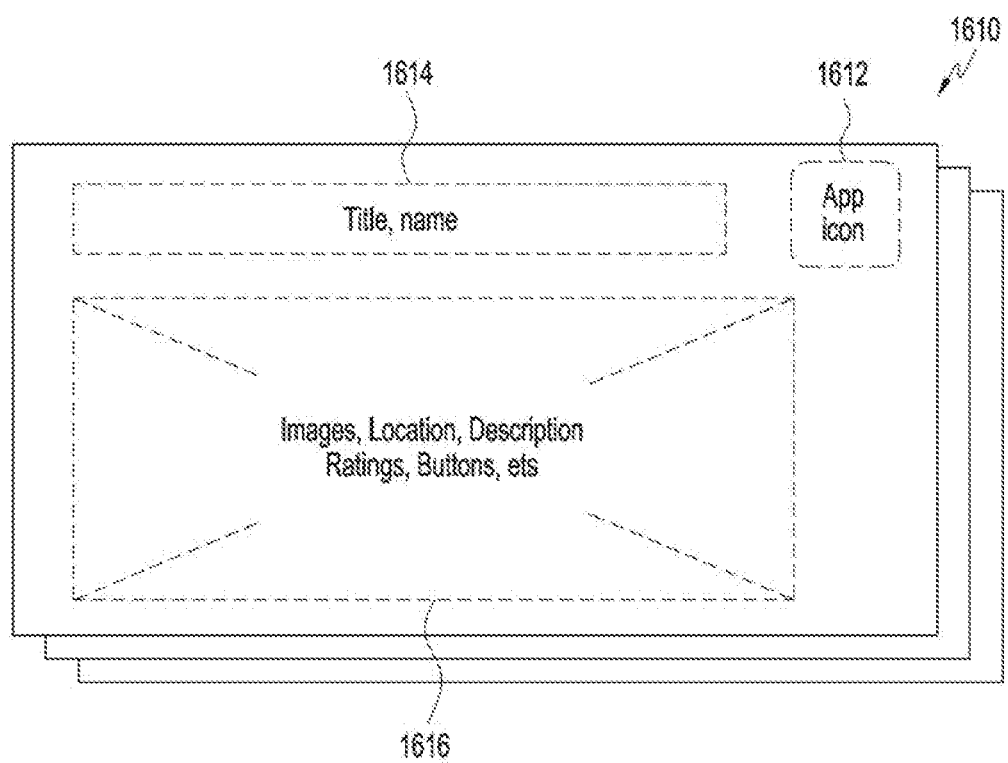
FIG. 16 is a view illustrating an example of second display information displayed on a second area of a vehicle device according to various embodiments.

FIG. 16 is a view illustrating an example of second display information displayed on a second area of a vehicle device according to various embodiments.

Referring to FIG. 16, the second display information may be at least one or more card-type objects 1610. The vehicle device 600 may generate at least one or more card-type objects 1610 using the second application-related information received corresponding to the vehicle-related context information from the electronic device.

According to an embodiment, the card-type object 1610 may include an application icon area 1612, a title or name area 1614, and a details area 1616.

The icon of the second application may be displayed on the application icon area 1612. The title or name of the second application may be displayed on the title or name area 1614. The second application-related information received corresponding to the vehicle-related context information may be displayed on the details area 1616.

Figure 17A:
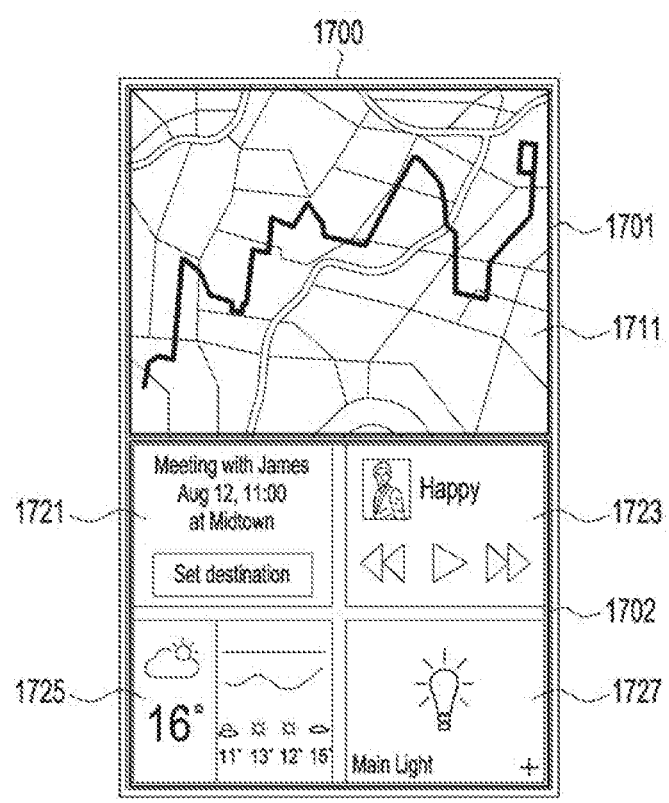
FIGS. 17A and 17B are views illustrating display information displayed on a vehicle device when a user gets on board.
Figure 17B:
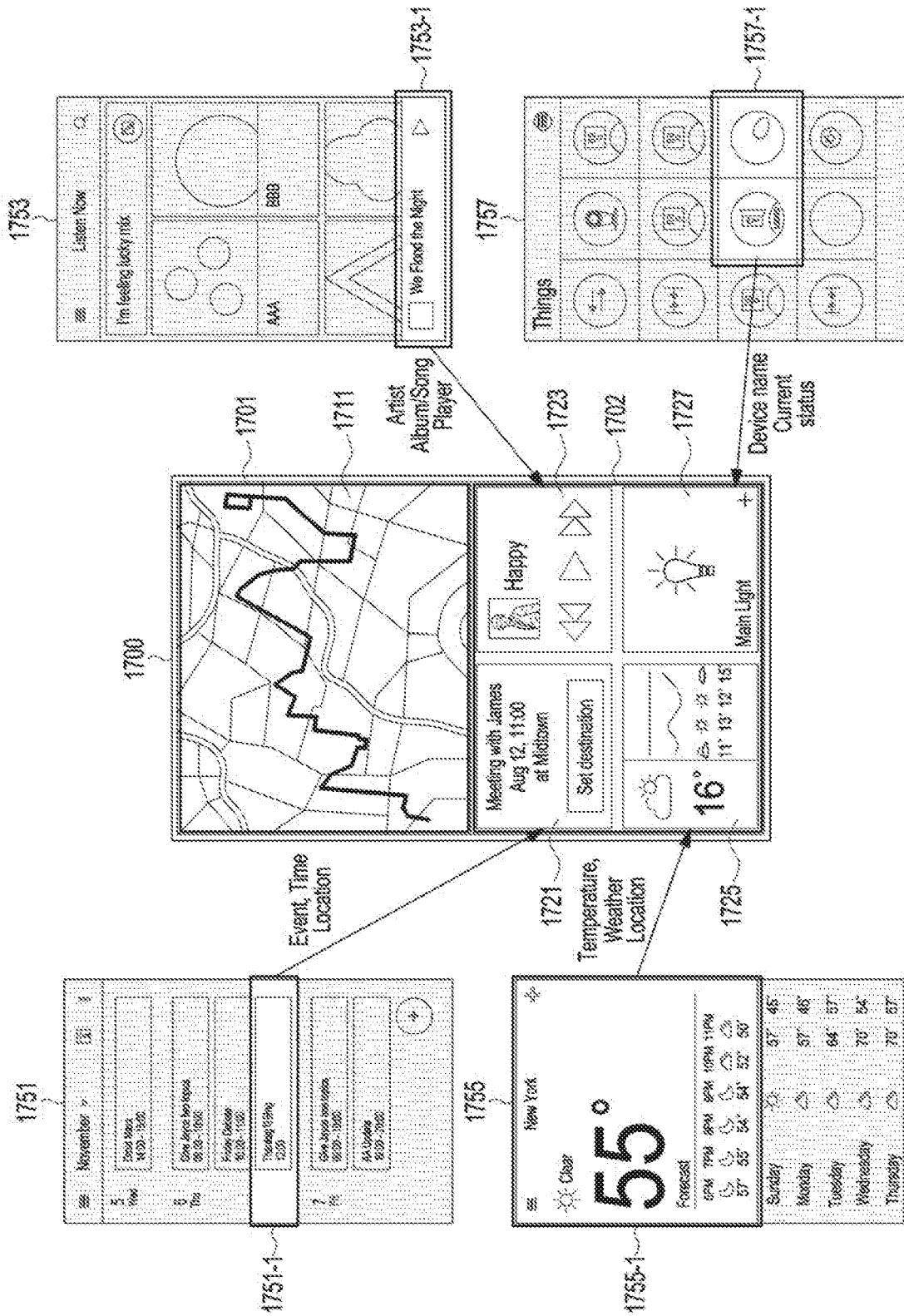

FIGS. 17A and 17B are views illustrating display information displayed on a vehicle device when a user gets on board.

Referring to FIG. 17A, when the user gets in the vehicle, the vehicle device 600 may execute a navigation application and display first display information 1711 corresponding to a navigation application execution screen on a first area 1701 of a display 1700 and display second display information 1721, 1723, 1725, and 1727 generated using vehicle boarding-based application-related information received from an electronic device corresponding to whether the user is on board on a second area 1702.

Referring to FIG. 17B, applications corresponding to information about whether the user is on board may be a scheduler application 1751, a music play application 1753, a weather application 1755, and a smart home application 1757. The electronic device may search for a scheduler application 1751, a music play application 1753, a weather application 1755, and a smart home application 1757 which are corresponding applications as the information about whether the user is on board is received from the vehicle device 600, perform a function corresponding to each of the searched-for applications, and transmit information according to the result of performing each function to the vehicle device 600.

According to an embodiment, the electronic device may transmit schedule notification information 1751-1 according to a schedule notification function of the scheduler application 1751 to the vehicle device 600. The schedule notification information 1751-1 may include an event, a time, and a location. According to an embodiment, the electronic device may transmit played music information 1753-1 according to a music play function of the music play application 1753 to the vehicle device 600. The played music information may include, e.g., an album title or singer's name. According to an embodiment, the electronic device may transmit weather information 1755-1 according to a weather information providing function of the weather application 1755 to the vehicle device 600. The weather information may include temperature, weather, and location. According to an embodiment, the electronic device may transmit smart device information 1757-1 according to a smart device function of the smart home application 1757 to the vehicle device 600. The smart device information may include a smart device name and a smart device current status.

The vehicle device 600 may generate second display information 1721, 1723, 1725, and 1727 using the schedule notification information 1751-1, played music information 1753-1, weather information 1755-1, and smart device information 1757-1 received from the electronic device. The second display information 1721, 1723, 1725, and 1727 may be generated to meet a predesignated vehicle display condition. The vehicle device 600 may display the generated second display information 1721, 1723, 1725, and 1727 on the second area 1702.

Figure 18A:
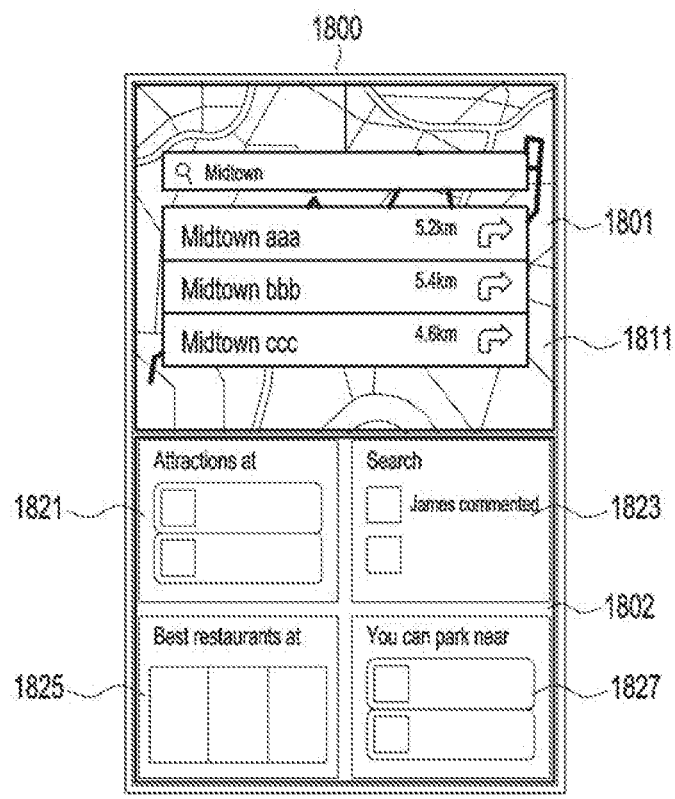
FIGS. 18A and 18B are views illustrating display information displayed on a vehicle device when a user searches for a destination on a navigation application in a vehicle.
Figure 18B:
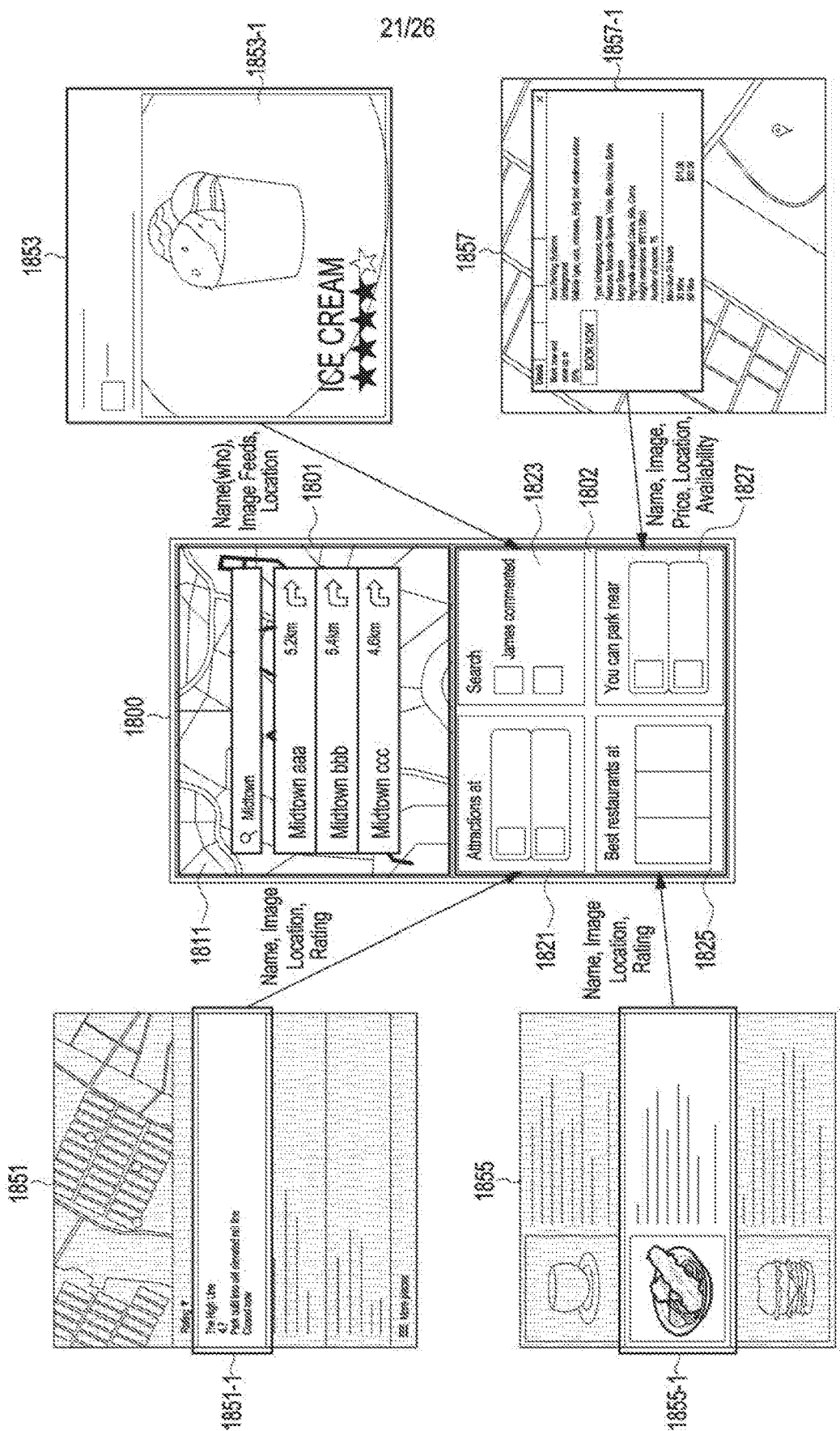

FIGS. 18A and 18B are views illustrating display information displayed on a vehicle device when a user searches for a destination on a navigation application in a vehicle.

Referring to FIG. 18A, when the user searches for a destination, e.g., "midtown," using a navigation application, the vehicle device 600 may display first display information 1811 corresponding to a destination search execution screen on a first area 1801 of a display 1800 and display second display information 1821, 1823, 1825, and 1827 generated using search application-related information received from an electronic device corresponding to the user's destination search on a second area 1802.

Referring to FIG. 18B, the search application may be a first search application 1851, a second search application 1853, a third search application 1855, and a fourth search application 1857. The electronic device may search for the first to fourth search applications 1851, 1853, 1855, and 1857, which are corresponding search applications, as the destination search information is received from the vehicle device 600, perform a search function corresponding to each of the searched-for applications, and transmit information according to the result of performing each search function to the vehicle device 600.

According to an embodiment, the electronic device may transmit first search result information 1851-1 of the first search application 1851 to the vehicle device 600. The first search result information 1851-1 may include the name, image, location, and fee rating of the destination accommodation. According to an embodiment, the electronic device may transmit second search result information 1853-1 of the second search application 1853 to the vehicle device 600. The second search result information 1853-1 may include the food name and image of the destination, whether the food of the destination is available, and the location related to the food of the destination. According to an embodiment, the electronic device may transmit third search result information 1855-1 of the third search application 1855 to the vehicle device 600. The third search result information 1855-1 may include the name, image, location, and price rating of the restaurant of the destination. According to an embodiment, the electronic device may transmit fourth search result information 1857-1 of the fourth search application 1857 to the vehicle device 600. The fourth search result information 1857-1 may include the name, image, price, location, and availability of the parking lot of the destination.

The vehicle device 600 may generate the second display information 1821, 1823, 1825, and 1827 using the first to fourth search result information 1851-1, 1853-1, 1855-1, and 1857-1 received from the electronic device. The second display information 1821, 1823, 1825, and 1827 may be generated to meet a predesignated vehicle display condition. The vehicle device 600 may display the generated second display information 1821, 1823, 1825, and 1827 on the second area 1802.

Figure 19:
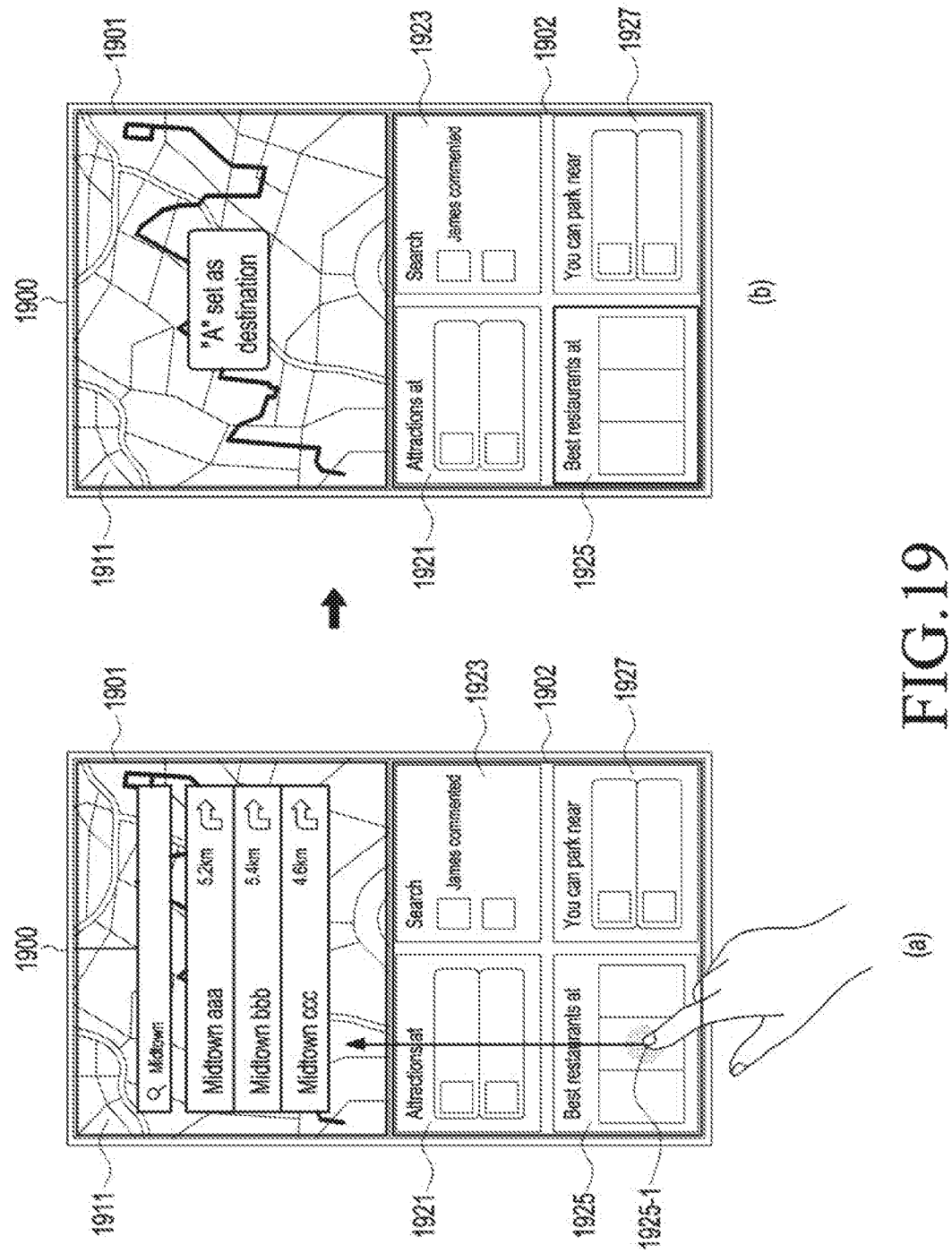
FIG. 19 is a view illustrating an example of setting information selected from a second area of a vehicle device to a destination of a first area according to various embodiments.

FIG. 19 is a view illustrating an example of setting information selected from a second area of a vehicle device to a destination of a first area according to various embodiments.

Referring to FIG. 19, when the user selects a destination 1925-1 (e.g., "A") using second display information 1921, 1923, 1925, and 1927 being displayed on a second area 1902 while first display information 1911 corresponding to a navigation application screen is displayed on a first area

1901, the vehicle device 600 may set "A" to the destination of the navigation application being executed. According to an embodiment, the destination 1925-1 may be selected by a user gesture input, such as a drag-and-drop. According to an embodiment, as the destination 1925-1 is selected, information corresponding to the destination 1925-1 may be transferred to the navigation application.

Figure 20:
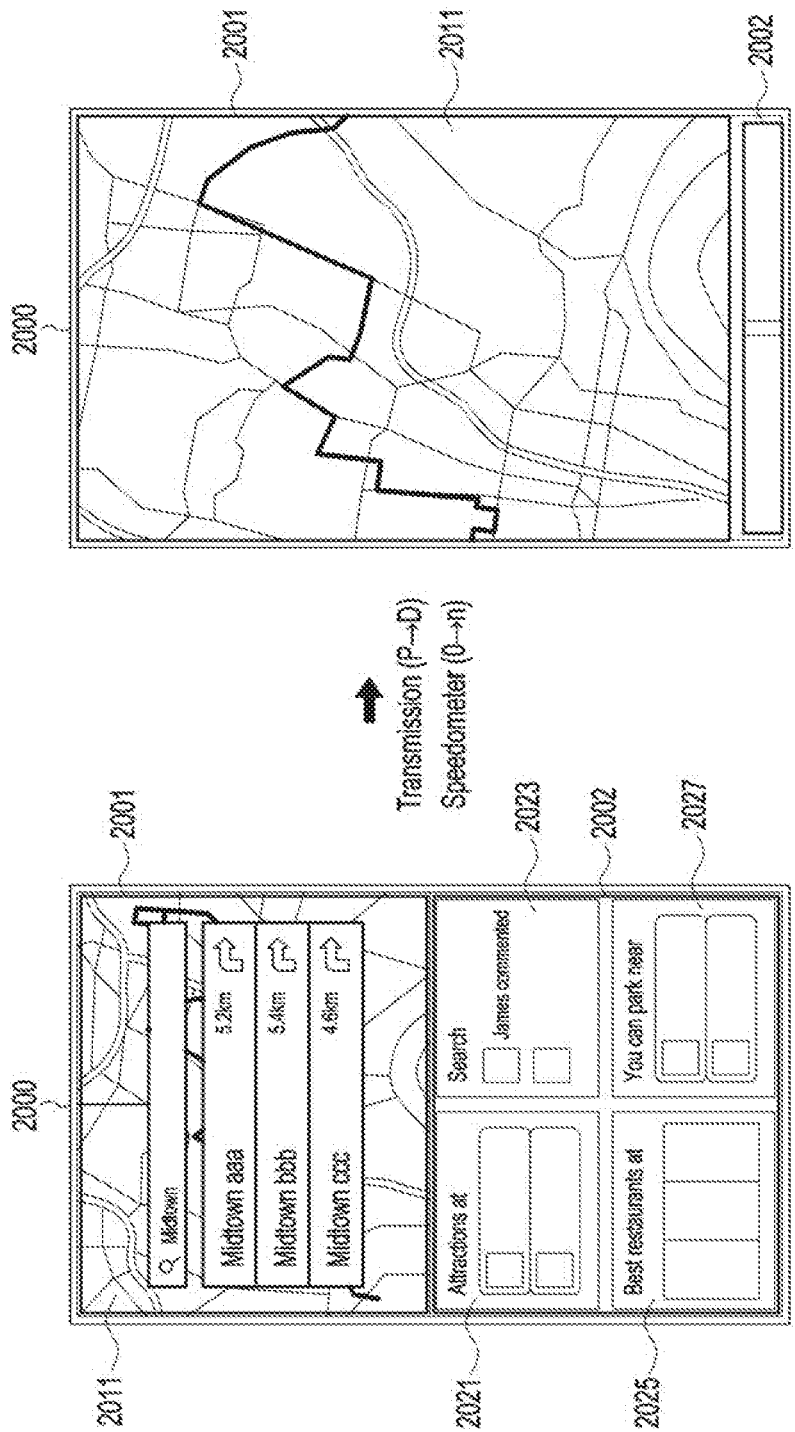
FIG. 20 is a view illustrating an example of display according to the start of driving after setting a destination on the navigation of a vehicle device according to various embodiments.

FIG. 20 is a view illustrating an example of display according to start of driving after setting a destination on the navigation of a vehicle device according to various embodiments.

Referring to FIG. 20, if a destination (e.g., "midtown") is input to a navigation application of a first area 2001, and the vehicle starts to drive while first display information 2011 corresponding to a navigation application screen and second display information 2021, 2023, 2025, and 2027 is displayed on a first area 2001, the vehicle device 600 may display only the first display information 2011 without displaying the second display information 2021, 2023, 2025, and 2027. According to various embodiments, upon sensing a gear shift from state P (parked state) to state D (driving state) via the transmission sensor and a change in speed from 0 to n via the speedometer sensor, the vehicle device 600 may determine that the vehicle starts to drive.

Figure 21:
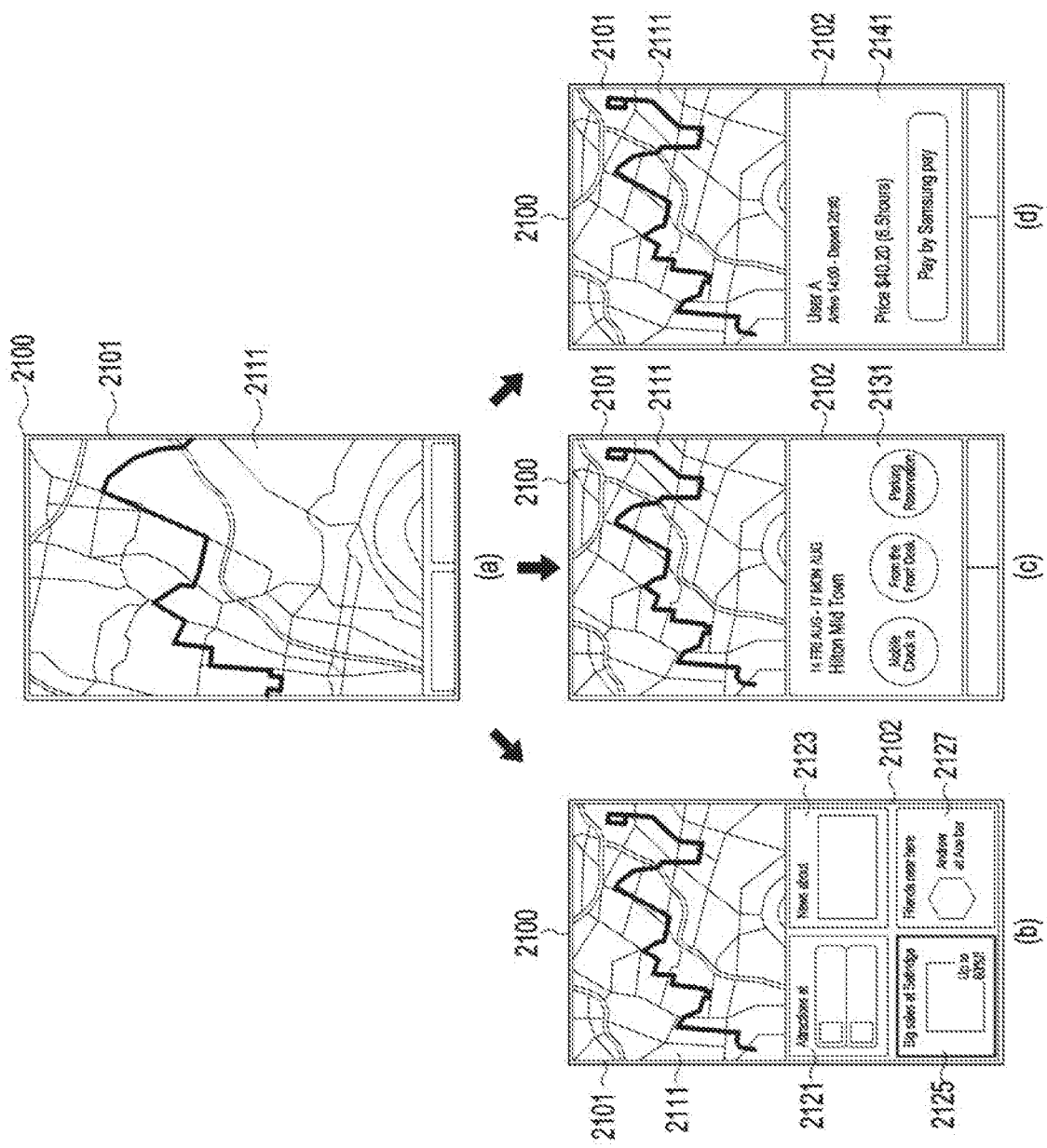
FIG. 21 is a view illustrating an example of display which is varied depending on changes in state while driving on a vehicle device according to various embodiments.

FIG. 21 is a view illustrating an example of display which is varied depending on changes in state while driving on a vehicle device according to various embodiments.

Referring to FIG. 21, upon turning to the parking state while displaying first display information 2111 corresponding to a navigation application screen on a first area 2101 but not on a second area 2102 according to the driving state as shown in FIG. 21(*a*), the vehicle device 600 may expand and display the second area 2102 as shown in FIG. 21(*b*).

According to an embodiment, upon turning to the state of reaching the destination 21 while the driving screen is displayed as shown in FIG. 21(*a*), the vehicle device 600 may display the second area 2102 including information 2131 about the destination as shown in FIG. 21(*c*). For example, in a case where the destination 21 is a hotel, the information 2131 about the destination may include hotel check-in information.

According to an embodiment, upon turning to the state of reaching the parking lot payment booth while the driving screen is displayed as shown in FIG. 21(*a*), the vehicle device 600 may display the second area 2102 including information 2141 about the parking lot payment booth as shown in FIG. 21(*d*). For example, the information 2141 about the parking lot payment booth may include parking time and parking rate information.

Figure 22A:
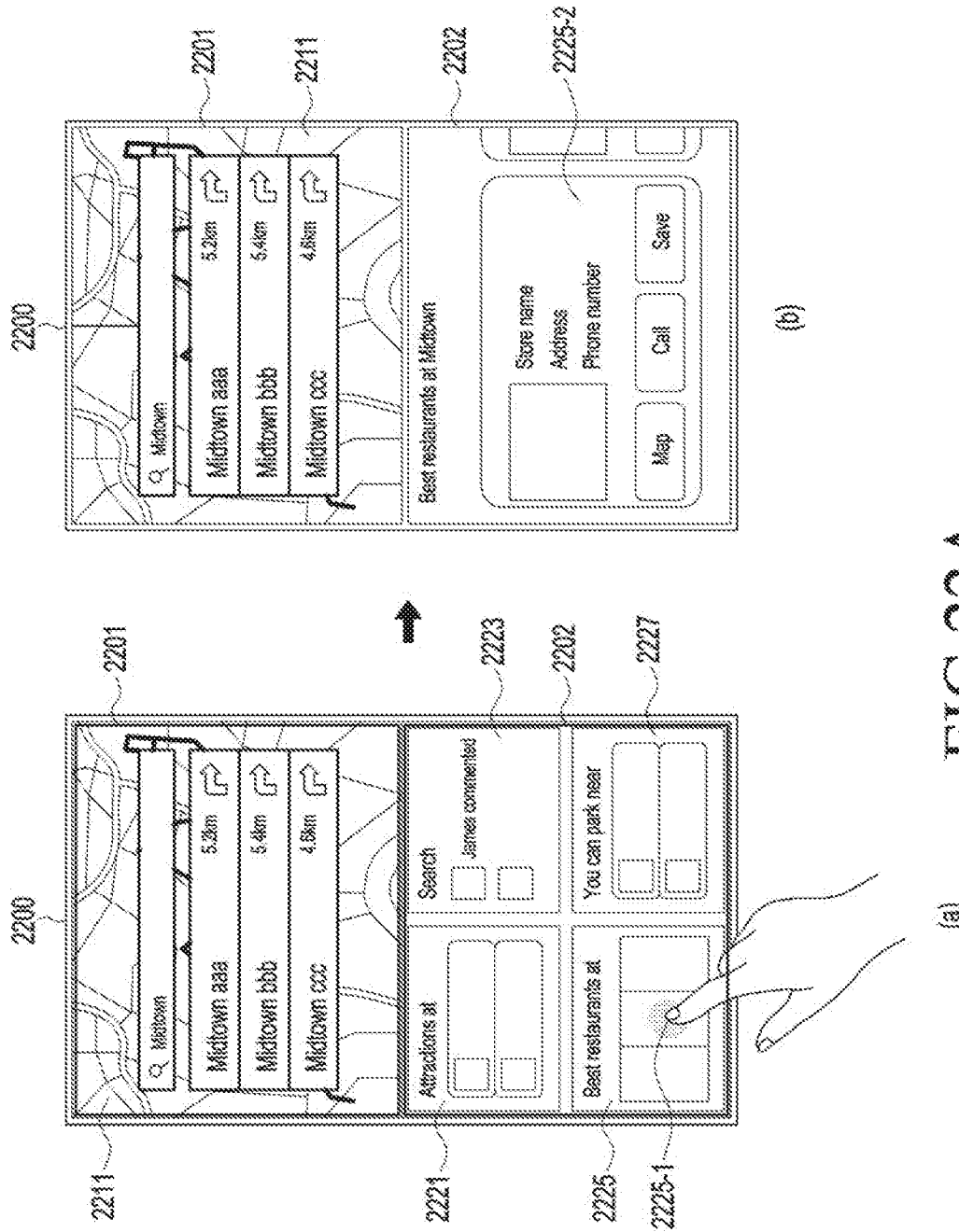
FIGS. 22A and 22B are views illustrating an example of display according to entry of a user gesture to a second area of a display according to various embodiments.
Figure 22B:
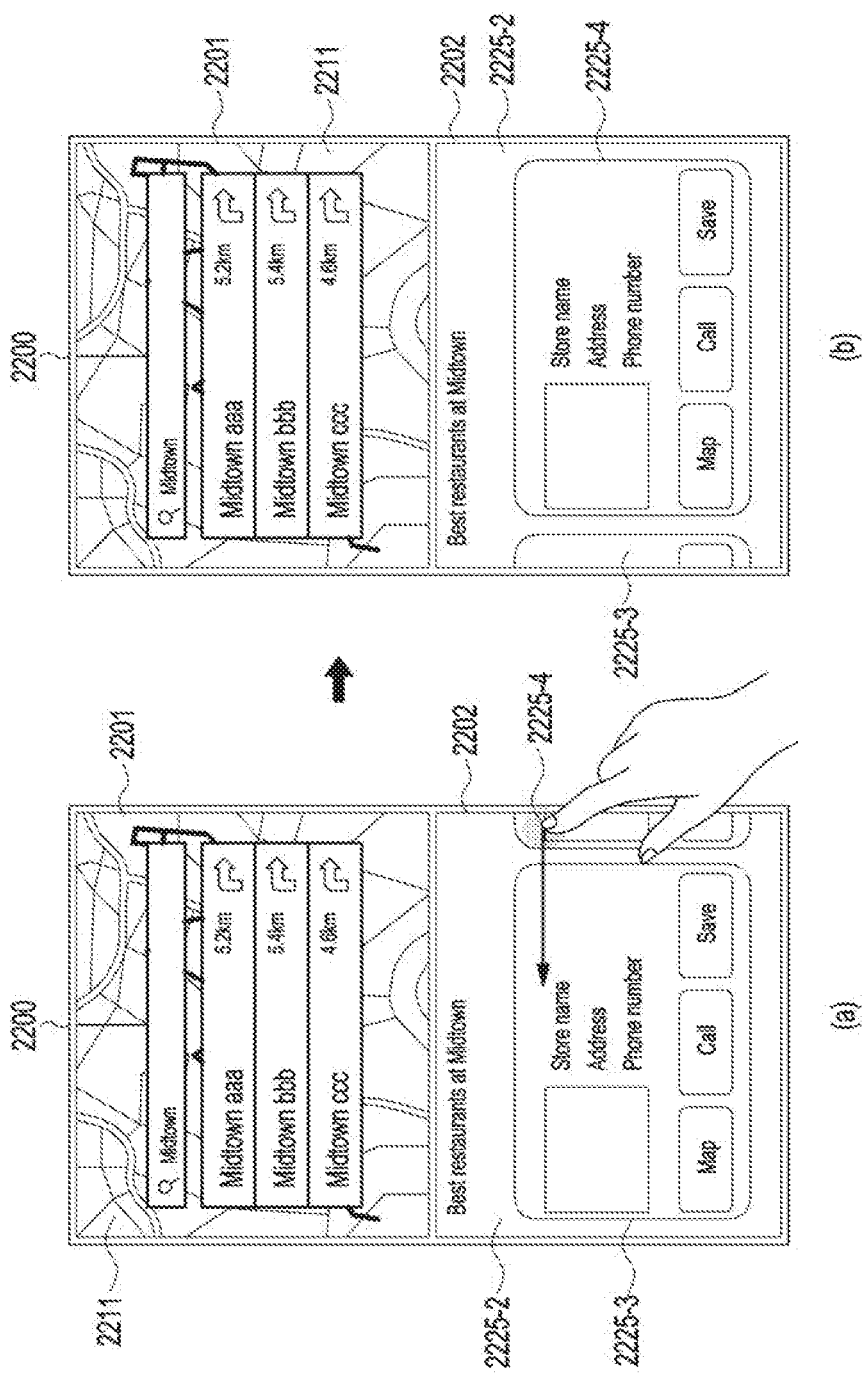

FIGS. 22A and 22B are views illustrating an example of display according to entry of a user gesture to a second area of a display according to various embodiments.

Referring to FIG. 22A, the vehicle device 600 may receive a user gesture input on a second area 2202 while a first area 2201 and the second area 2202 are displayed as shown in FIG. 22A(a). According to an embodiment, if the user makes a tap input to select any one piece of information 2225-1 among second display information 2221, 2223, 2225, and 2227 included in the second area 2202, the vehicle device 600 may expand the selected information 2225-1 and display the expanded information 2225-2 on the second area 2202 as shown in FIG. 22A(b).

Referring to FIG. 22B, the vehicle device 600 may select card-type objects 2225-3 and 2225-4 included in the expanded information 2225-2 via a user gesture input while the expanded information 2225-2 is displayed on the second area 2202 as shown in FIG. 22B(a). According to an embodiment, if there is a user gesture input to tap and drag any one of the card-type objects 2225-3 and 2225-4 included in the expanded information 2225-2 in a first direction, the vehicle device 600 may move and display the card-type object 2225-2 which has been tapped in the first direction.

Each of the aforementioned components of the electronic device may include one or more parts, and a name of the part may vary with a type of the electronic device. The electronic device in accordance with various embodiments of the present disclosure may include at least one of the aforementioned components, omit some of them, or include other additional component(s). Some of the components may be combined into an entity, but the entity may perform the same functions as the components may do.

The term 'module' may refer to a unit including one of hardware, software, and firmware, or a combination thereof. The term 'module' may be interchangeably used with a unit, logic, logical block, component, or circuit. The module may be a minimum unit or part of an integrated component. The module may be a minimum unit or part of performing one or more functions. The module may be implemented mechanically or electronically. For example, the module may include at least one of Application Specific Integrated Circuit (ASIC) chips, Field Programmable Gate Arrays (FPGAs), or Programmable Logic Arrays (PLAs) that perform some operations, which have already been known or will be developed in the future.

According to various embodiments, at least a part of the device (e.g., modules or their functions) or method (e.g., operations) may be implemented as instructions stored in a computer-readable storage medium e.g., in the form of a program module. The instructions, when executed by a processor (e.g., the processor 120), may enable the processor to carry out a corresponding function. The computer-readable storage medium may be e.g., the memory 617 of the vehicle device 600 or the memory 130 of the electronic device 100.

The computer-readable storage medium may include a hardware device, such as hard discs, floppy discs, and magnetic tapes (e.g., a magnetic tape), optical media such as compact disc ROMs (CD-ROMs) and digital versatile discs (DVDs), magneto-optical media such as floptical disks, ROMs, RAMs, flash memories, and/or the like. Examples of the program instructions may include not only machine language codes but also high-level language codes which are executable by various computing means using an interpreter. The aforementioned hardware devices may be configured to operate as one or more software modules to carry out exemplary embodiments of the disclosure, and vice versa.

According to various embodiments, there is provided a storing medium storing a program executed on a vehicle device, the program displaying an execution screen of a first application stored in a memory on a first area on a display, performing control to transfer vehicle-related context information to the electronic device based on information obtained by the at least one or more sensors, and if display information related to a second application corresponding to the vehicle-related context information is received from the electronic device, performing control to display the received display information on a second area on the display.

According to various embodiments, there is provided a storage medium storing a program executed on an electronic device, the program receiving vehicle-related context information from a vehicle device, performing a first function corresponding to the vehicle-related context information using an application associated with the vehicle-related context information among at least one or more applications and transmitting first information according to a result of performing the first function to the vehicle device, and when a first request based on the first information is received from the vehicle device, performing a second function corresponding to the first request using the application associated with the vehicle-related context information and transmitting second information according to a result of performing the second function to the vehicle device.

Modules or programming modules in accordance with various embodiments of the disclosure may include at least one or more of the aforementioned components, omit some of them, or further include other additional components. Operations performed by modules, programming modules or other components in accordance with various embodiments of the disclosure may be carried out sequentially, simultaneously, repeatedly, or heuristically. Furthermore, some of the operations may be performed in a different order, or omitted, or include other additional operation(s).

It is apparent to one of ordinary skill in the art that the vehicle device and electronic device according to various embodiments of the present invention as described above are not limited to the above-described embodiments and those shown in the drawings, and various changes, modifications, or alterations may be made thereto without departing from the scope of the present invention.

The invention claimed is:

1. A vehicle device, comprising:
a display;
a memory;
at least one or more sensors;
a communication unit configured to communicate with an external electronic device; and
a processor configured to:
identify whether a user enters a vehicle based on information obtained by the at least one or more sensors,
transmit, through the communication unit, information about the entering of the vehicle of the user and vehicle location information to the external electronic device, wherein the vehicle location information includes at least one of information about a current location of the vehicle, information about a destination of the vehicle, and information about a location designated by the user,
display first information by a navigation application executed by the processor on a first area of the display,
receive, through the communication unit, second information by an application executed by the external electronic device based on the information about the entering of the vehicle of the user and the vehicle location information, wherein the application is designated from among a plurality of applications of the external electronic device in response to the information about the entering of the vehicle of the user and the vehicle location information,
display the second information received from the external electronic device on a second area of the display while displaying the first information by the navigation application on the first area of the display, and
set a destination of the navigation application executed by the processor by using destination information included in the second information obtained by the application executed by the external electronic device based on a drag and drop input to the first area from the second area.

2. The vehicle device of claim 1, wherein the processor is configured to modify the second information to display vehicle display information based on a predesignated vehicle display condition and display the vehicle display information on the second area of the display.

3. The vehicle device of claim 2, wherein the predesignated vehicle display condition includes at least one of an image type set not to be displayed on the display, a color type set not to be displayed on the display, a size and length of text displayable on the display, a type and size of an object displayable on the display, a number of objects displayable on the display, and a location displayable on the display.

4. The vehicle device of claim 2, wherein an object displayable on the display includes a card-type object, and wherein the card-type object includes an application icon area, a title area, and a details area.

5. A method of display information obtained from an external electronic device on a vehicle device, the method comprising:
identifying whether a user enters a vehicle based on information obtained by at least one or more sensors of the vehicle device,
transmitting, through a communication unit, information about the entering of the vehicle of the user and vehicle location information to the external electronic device, wherein the vehicle location information includes at least one of information about a current location of the vehicle, information about a destination of the vehicle, and information about a location designated by the user,
displaying first information by a navigation application executed by the vehicle on a first area of a display of the vehicle device,
receiving, through the communication unit, second information by an application executed by the external electronic device based on the information about the entering of the vehicle of the user and the vehicle location information, wherein the application is designated from among a plurality of applications of the external electronic device in response to the information about the entering of the vehicle of the user and the vehicle location information,
displaying the second information received from the external electronic device on a second area of the display while displaying the first information by the navigation application on the first area of the display, and
setting a destination of the navigation application executed by the vehicle by using destination information included in at least part of the second information by the application executed by the external electronic device based on drag and drop input to the first area from the second area.

6. The method of claim 5, further comprising modifying the second information to vehicle display information based on a predesignated vehicle display condition and displaying the vehicle display information on the second area of the display.

7. The method of claim 6, wherein the predesignated vehicle display condition includes at least one of an image type set not to be displayed on the display, a color type set not to be displayed on the display, a size and length of text displayable on the display, a type and size of an object displayable on the display, a number of objects displayable on the display, and a location displayable on the display.

8. A non-transitory storage medium storing a program executable on a vehicle device, the program comprising:
identifying whether a user enters a vehicle based on information obtained by at least one or more sensors of the vehicle device, transmitting, through a communication unit, information about the entering of the vehicle of the user and vehicle location information to an external electronic device, wherein the vehicle location information includes at least one of information about a current location of the vehicle, information about a destination of the vehicle, and information about a location designated by the user, displaying first information by a navigation application executed by the vehicle on a first area of a display of the vehicle device, receiving, through the communication unit, second information by an application executed by the external electronic device based on the information about the entering of the vehicle of the user and the vehicle location information, wherein the application is designated from among a plurality of applications of the external electronic device in response to the information about the entering of the vehicle of the user and the vehicle location information, displaying the second information received from the external electronic device on a second area of the display while displaying the first information by the navigation application on the first area of the display, and setting a destination of the navigation application executed by the vehicle by using destination information included in at least part of the second information by the application executed by the external electronic device based on drag and drop input to the first area from the second area.

* * * * *